(12) United States Patent
Ly

(10) Patent No.: US 6,405,312 B1
(45) Date of Patent: Jun. 11, 2002

(54) KERBEROS COMMAND STRUCTURE AND METHOD FOR ENABLING SPECIALIZED KERBERO SERVICE REQUESTS

(75) Inventor: Tania Trinh Ly, Irvine, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/148,644

(22) Filed: Sep. 4, 1998

(51) Int. Cl.[7] ............................................... H04L 12/22
(52) U.S. Cl. ....................................... 713/155; 713/201
(58) Field of Search ............................... 713/200–202, 713/155–159, 182, 185, 168

(56) References Cited

U.S. PATENT DOCUMENTS 5,032,979 A * 7/1991 Hecht et al. ................ 713/201
5,455,953 A * 10/1995 Russell ....................... 710/266

OTHER PUBLICATIONS

Kerberos V5 Installation Guide. Massachusetts Institute of Technology (Copyright 1985–1999 and 1983) and OpenVision Technologies, Inc. (Copyright 1996) [retrieved on Dec. 12, 2000]. Retrieved from the Internet:°URL:www.helpdesk.umd.edu/linux/security/install<.*

Kerberos Commands. Cisco Systems Inc.. Copyright 1989–1997 [retrieved on Dec. 12, 2000]. Retrieved from the Internet: °URL:www.ieng.com/univercd/cc/td/doc/product/software/ios113ed/113ed_cr/secur_r/srprt2/sr_ker-b.htm<.*

Unix Kerberos Commands. Doug Engert, dated Jan. 22, 1997 revised Feb. 6, 1997. [retrieved on Dec. 12, 2000]. Retrieved from the Internet: °URL: www.anl.gov/ECT/DCE/unixcmd.html<.*

* cited by examiner

Primary Examiner—Gilberto Barron, Jr.
(74) Attorney, Agent, or Firm—Alfred W. Kozak; Mark T. Starr; Lise A. Rode

(57) ABSTRACT

A system and method is provided whereby a flexible group of new Kerberos commands are operable for the user in a system wherein a Kerberos server is networked with a client server to provide a multiple number of new commands to the client user. Among other features, the new Kerberos commands allow the user to obtain ticket-granting-tickets, or to destroy his active tickets, or further to inquire as to the type of Kerberos commands available, to change one's Kerberos password in the Kerberos database or to inquire or add to one's Principal Identification (ID) to the Kerberos database. The client user makes a Kerberos service request from the client server through a Menu-Assisted Resource Control (MARC) program working in conjunction with a Kerberos Support Library, having a Directive interface and configuration file which work in communication with the Kerberos server's database and key distribution center.

3 Claims, 20 Drawing Sheets

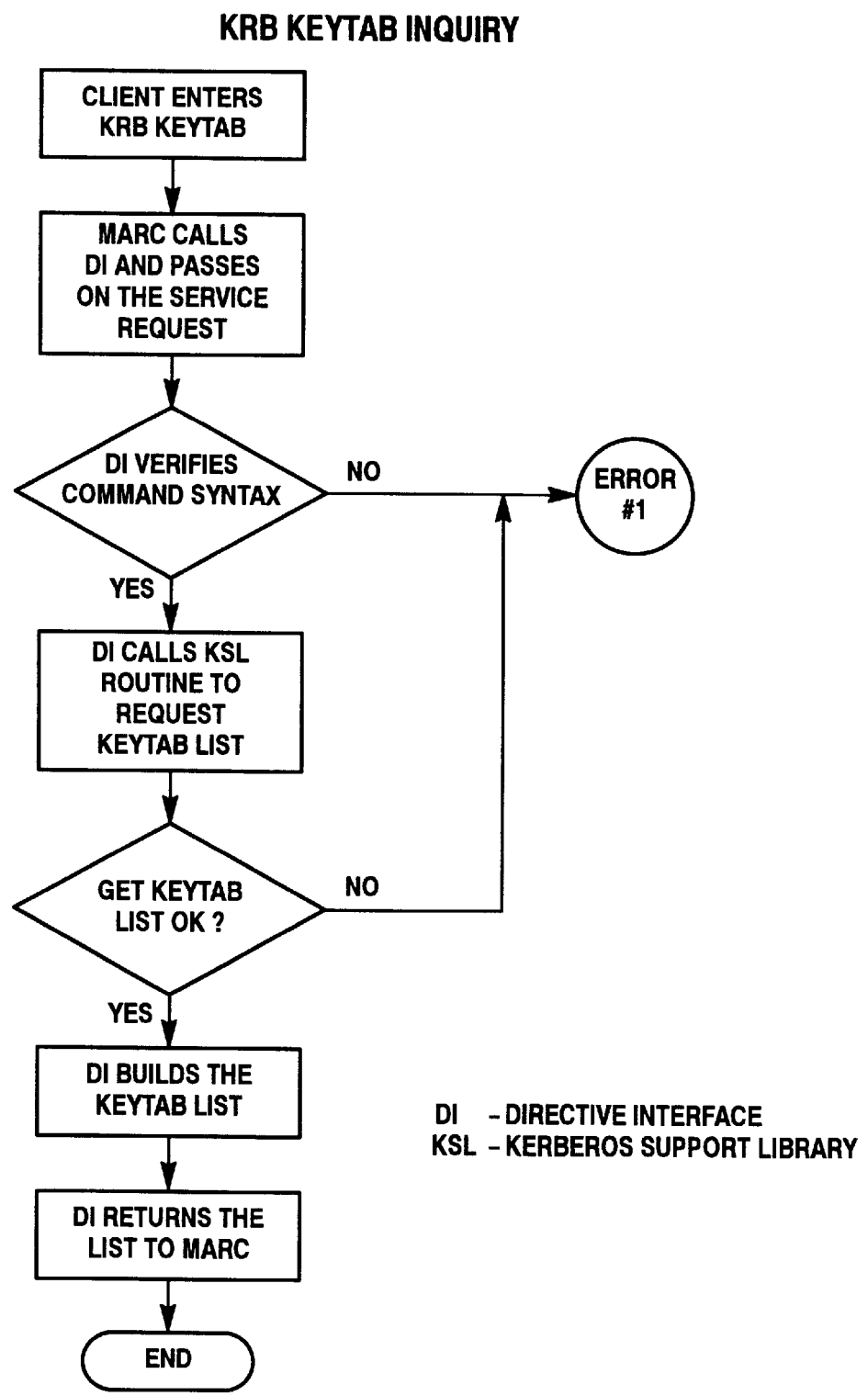
Figure 3F1

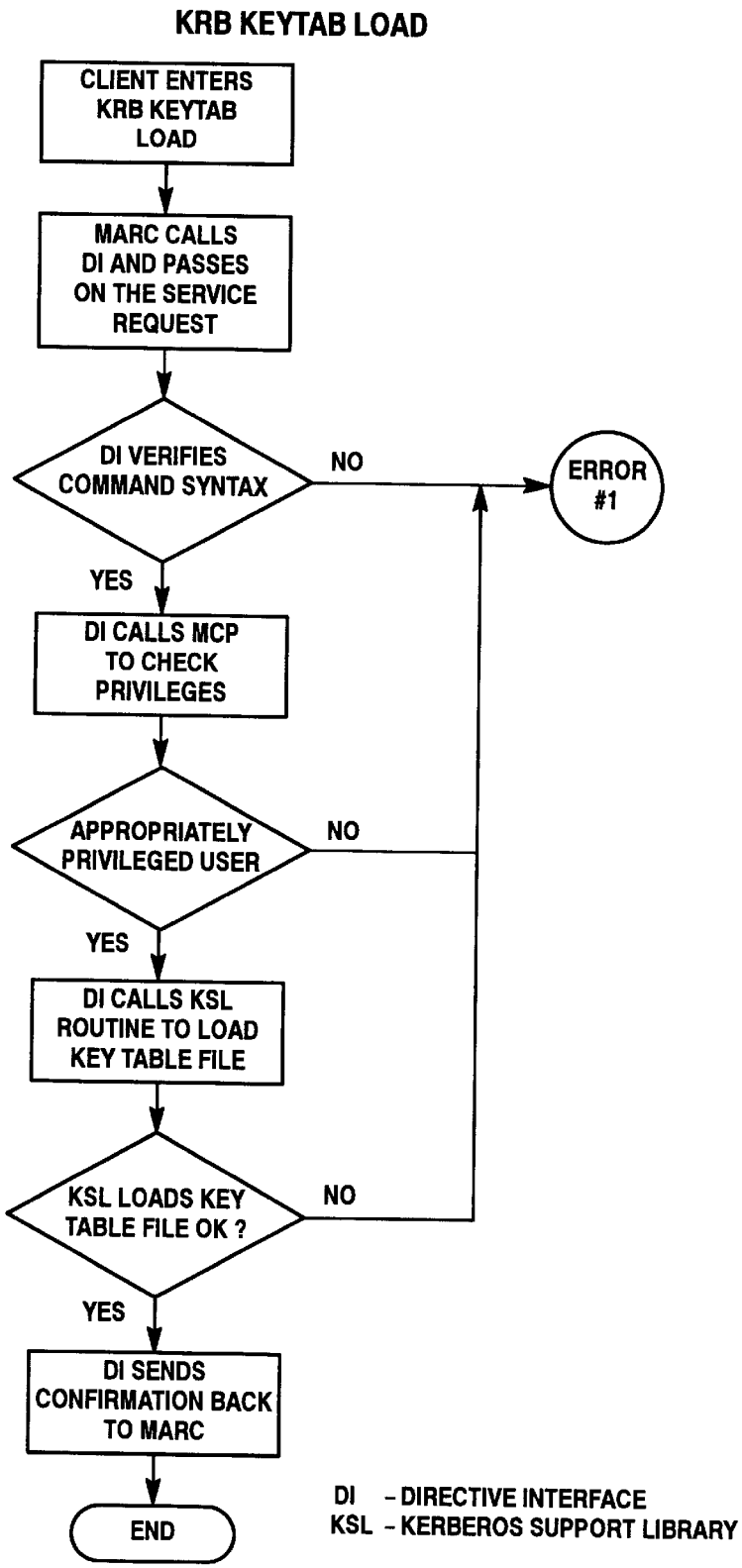
Figure 3F2

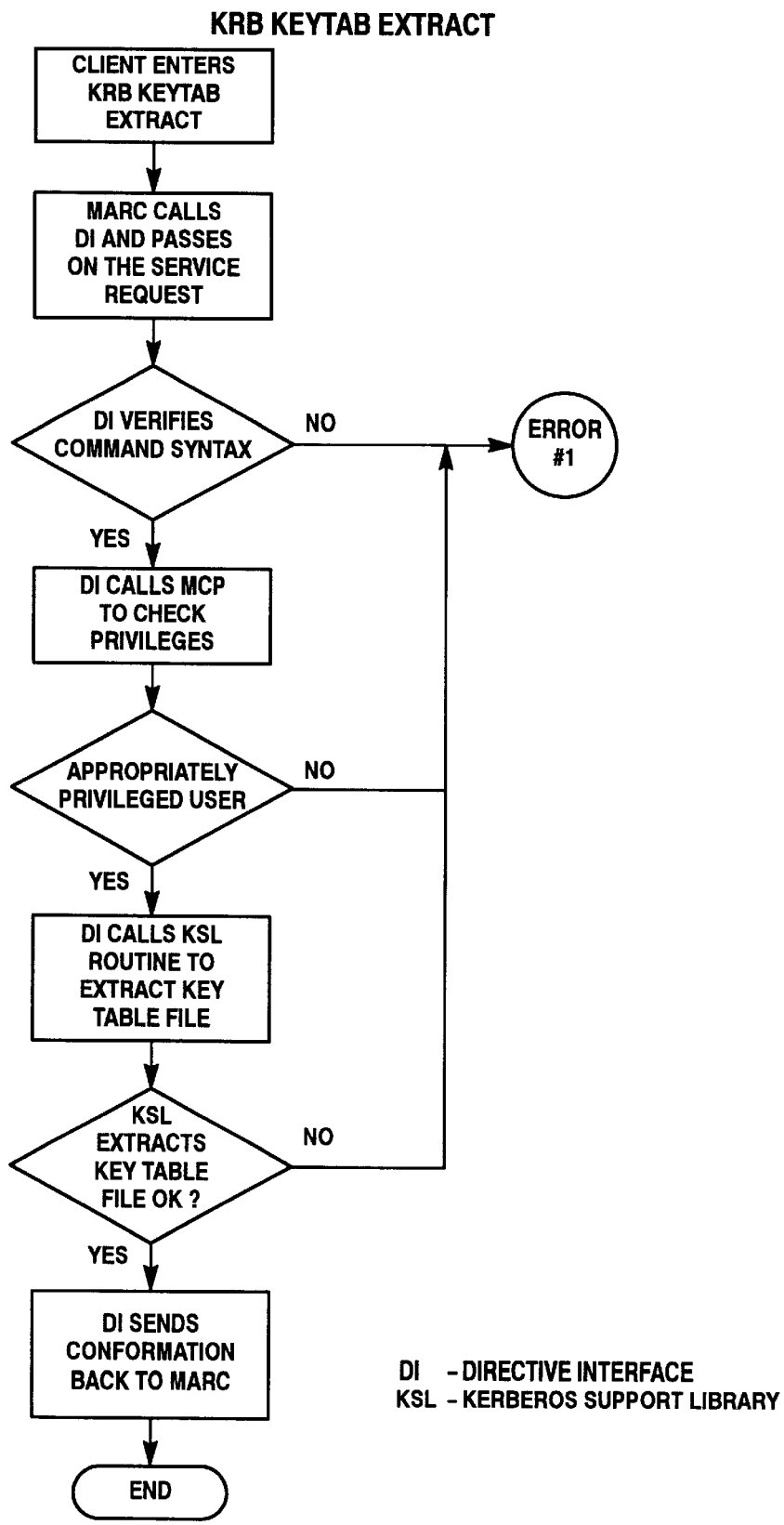
Figure 3F3

KRB LIST

DI — DIRECTIVE INTERFACE
KSL — KERBEROS SUPPORT LIBRARY

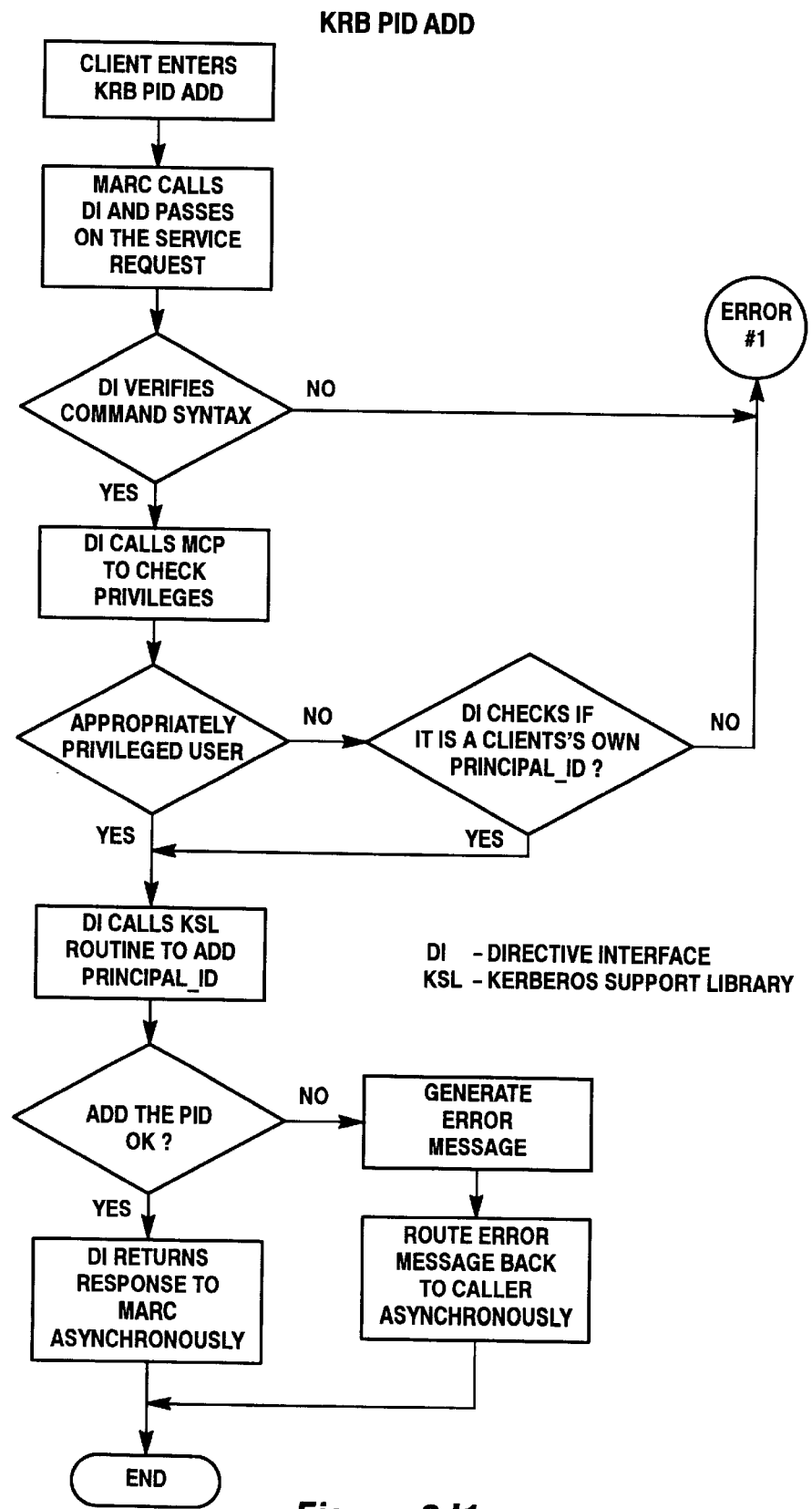
Figure 3J1

KERBEROS COMMAND STRUCTURE AND METHOD FOR ENABLING SPECIALIZED KERBERO SERVICE REQUESTS

CROSS-REFERENCES TO RELATED APPLICATIONS

This application is related to several applications as indicated below and which are incorporated by reference:

U.S. Ser. No. 09/026,746, entitled "Expedited Message Control for Synchronous Response in a Kerberos Domain," which issued as U.S. Pat. No. 6,175,920.

U.S. Ser. No. 08/948,840, entitled "Synchronous Message Control System in a Kerberos Domain," which issued as U.S. Pat. No. 6,055,639 on Apr. 25, 2000.

BACKGROUND OF THE INVENTION

In present day networks and computer systems, the need for privacy and proper authentication of the network and computer Users is one of the foremost areas of concern. The Kerberos security system is generally used today as a developing standard for authenticating network Users, and is often used in the UNIX community and in the Unisys ClearPath systems where it is useful because it functions in a multi-vendor network and does not require the transmission of passwords over the network.

Kerberos operates to authenticate Users, that is to say, it determines if a User is a valid User. It does not provide other security services such as audit trails. Kerberos authentication is based on "passwords" and does not involve physical location or smart cards.

In order to implement Kerberos in a system, each computer in a network must run the Kerberos software. Kerberos works by granting a "ticket", which ticket is honored by all of the network computers that are running the Kerberos protocol. The tickets are encrypted, so that passwords never go over the network in "clear text" and the Users do not need to enter their password when accessing a different computer.

Since there is often a need to run Kerberos on every single computer in a network, this sometimes presents a problem for potential Users. Considerable effort and time may be involved in porting Kerberos to each different hardware platform in the network. Kerberos users tended generally, to be large networks which were furnished with extended expertise. Since such resources were not generally available to smaller networks, it was sometimes a problem to make it available to smaller networks, which normally could not justify the cost and expense.

Kerberos networks are involved with the type of systems designated as "symmetric crypto-systems". One type of symmetric crypto-system is called the "Kerberos Authentication System". This type of system was discussed and published on the Internet by J. T. Kohl and D. C. Neuman in an article entitled *"The Kerberos Network Authentication Service"*, which was published in September 1993 on the Internet RFC 1510.

Kerberos uses symmetric key crypto-systems as a primitive and often uses the Data Encryption Standard (DES) as an inter-operability standard. Kerberos systems have been adopted as the basis for security service by the Open Software Foundations (OSF), and Distributed Computing Environment (DCE). Thus, Kerberos was designed to provide authentication and key-exchange, but were not particularly designed to provide digital signatures.

Thus, networks require systems and methods for securing communications which provide for one User to authenticate itself to another User, and additionally, this often required systems for securing communications which facilitated digital signatures being placed on a message, in order to provide for non-repudiation.

Kerberized environments involve the transmittal of messages, for example, from a server to a client, which leads to several major problems in these networks. These problems involve the situation of how to perform any number of useful functions in the Kerberos environment which may require unusual and flexible types of command structures.

The present disclosure involves the provision of a new User interface on a Unisys ClearPath NX Server, which then permits Users to perform many flexible Kerberos functions. Additionally, the User interface also permits the User to take advantage of certain networking security products of the Unisys ClearPath NX Server that provides a more secure network logon process.

SUMMARY OF THE INVENTION

A Kerberos Domain is provided whereby a client-user may communicate with a specialized client server and a Kerberos Server. The client server (ClearPath Server) provides a Menu-Assisted Resource Control program (MARC) which enables client requests to access a Kerberos Support Library via a Directive Interface. The client server 13 has a Universal Data Port 15 which communicates with a Kerberos Server 20. The Kerberos Server has a Key Distribution Center 22, a Key Table File 26K a Kerberos Administrative Module 24, and a Kerberos Database 28 which provide information and data to the Client Server 13 which has a configuration file 42, a Key Table File 26C and Encryption Library 32, a UserData Module 36, a General Security Service Application Program Interface Support Library 38 and the Master Control Program 60, all of which interconnect to the Kerberos Support Library 34.

The present method and system provides for the creation and implementation of a series of User commands to the Kerberos networks which allow the User to execute a variety of necessary functions whereby the User's request will be responded to by the Client Server Unit 13.

The flexible and User functions involve giving the client-user the ability to inquire as to the list of Kerberos commands available, inquire and change the clock skew value, inquire and change the Debug options, obtain a ticket granting ticket, to destroy the client-user's previously active tickets, to inquire and/or manipulate a Key Table file, to find the principals in the Key Table file, to load and extract information from a Key Table file, to list the ticket granting tickets residing in the client-user's ticket cache, to load a configuration file into memory, to change the User's Principal Kerberos password in the Kerberos database, to add a User's ID to the Kerberos database, to inquire as to a Realm Name, and to change an option designated as the Re-play Detection Option.

BRIEF DESCRIPTION OF THE DRAWINGS

FIG. 3F1 is a flow chart indicating the command function designated KRB KEYTAB INQUIRY, which permits a User to inquire as to the application principals in the Key Table File;

FIG. 3F2 is a flow chart illustrating the functional command KRB KEYTAB LOAD, which permits a User to load the Key Table File (created on the UNIX Kerberos Server) to the ClearPath Server from tape;

FIG. 3F3 is a flow chart illustrating the command function KRB KEYTAB EXTRACT, which allows a User (on the ClearPath system) to extract the Key Table File, (which was created on the UNIX Kerberos Server) to the ClearPath Server across the network;

FIG. 3J1 is a flow chart illustrating the command function designated KRB PID ADD, which allows a ClearPath system User to add his Principal_ID to the Kerberos database;

GLOSSARY OF TERMS

Figure 1:
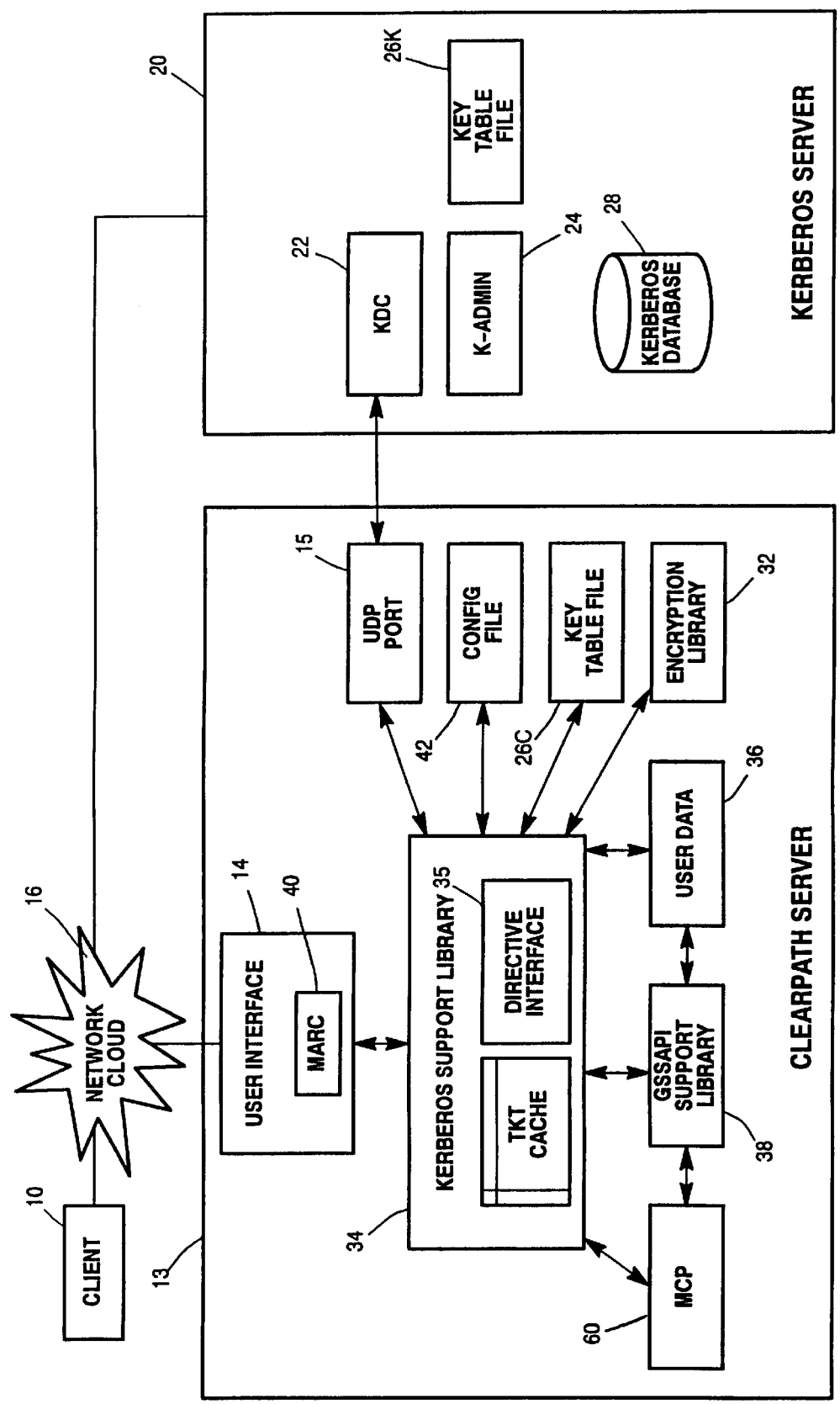
FIG. 1 is a general block diagram showing a client-User connection to a ClearPath Server and a Kerberos Server.

1. DP (User Datagram Protocol)—This is a communication protocol which is used as one of a number of "standard" methods of communicating information across a network. An extension of this is a UDP Port; a communication port which is used for UDP communications.
2. HLCN (Host LAN Connection)—The ClearPath NX HLCN product provides the implementation of NetBIOS and IPX protocols that permit terminal services to the ClearPath NX Server over Netware.
3. MCS (Message Control System)—Programs (with special privileges) on ClearPath NX systems that control the flow of messages between terminals, application programs, and the operating system (MCP). Reference Unisys "A Series DCALGOL Programming Reference Manual," May 1989/Form 5014574.380 (Release Mark 3.8.0).
4. COMS—(Communications Management System)—is a Unisys Message Control System that supports processing for a network on the Unisys ClearPath NX Server. Reference: Unisys A Series Communications Management System (COMS) Operations Guide. May 1989 1154523.380.
5. MARC (Menu Assisted Resource Control)—The MARC window provides access to the MARC program. One of the functions of the MARC program is to handle network and session control and provide requested information and system messages for COMS. The MARC window (program) is always in operation in COMS. Reference Unisys "A Series Menu-Assisted Resource Control (MARC)" Unisys Operations Guide, February 1992/Form #8600 0404-100. (Release Mark 4.0.0).
6. GSS-API (Generic Security Service)—Application Program Interface)—This is the draft-standard interface application programs use to access available security services generically. The actual security services are provided by underlying mechanisms. Possible implementation choices for mechanisms include, but are not limited to Kerberos, Secure Sockets, DASS. The goal is that applications do not require any knowledge about the underlying mechanism in order to use it. Reference: GSS-API Version 2 on A Series Functional Design Specification 95132/3 Version C. Published Jul. 23, 1996 by Unisys Corp.
    6a) DASS—A security mechanism using the X.509 capabilities.
    6b) Secure Sockets—A security mechanism that has growing popularity on the Internet.
7. HLCNTS (Host LAN Connection Terminal Service)—ClearPath NX terminal service product predicated on the underlying HLCN product. HLCNTS provides connection based communications between clients using Netware based IPX/NetBIOS and the ClearPath NX. Reference: Unisys Host LAN Connection Terminal Services (HLCNTS) 0.1.4/Version D, Jun. 26, 1995.
8. Asynchronous Message (Definition #1)—A message (data in display or non-display format) which is generated by a concurrent independent process yet requiring occasional synchronization and cooperation of other process(es). (Definition #2):—A message (data in display or non-display format) which was generated in an environment where asynchronism of processes exists. Reference: "*An Introduction to Operating Systems*" by Harvey H. Deitel (Addison-Wesley Publishing Company) First Edition 1984.
9. Synchronous Message #1—A message (data in display or non-display format) which is generated by a concurrent process dependent upon its own environment. #2—A message (data in display or non-display format) which was generated in an environment where synchronism of a single process exists. Reference: "*An Introduction to Operating Systems*" by Harvey M. Deitel (Addison-Wesley Publishing Company) First Edition 1984.
10. Kerberos Support Library (KSL)—This library provides functions to support the various Kerberos message exchange protocols and a number of User administration functions. It closely interacts with the GSS Library and other system software. Reference: A-EAM Kerberos Support Library—Functional Specification 93187/3 Version C. Published Mar. 6, 1997 by Unisys Corp.

11. Stack Capsulate—A "snapshot" or "outline" of a non-detailed process environment. For explanatory purposes, it is a mid-level overview of the processing environment highlighting events in a sequential order.
12. Dialog No. (Dialog Number)—MARC establishes dialog(s) Numbers on behalf of a client requesting services. A Dialog Number is the internal/external number associated with a client which is accessing (using) MARC.
13. NX MCP Environment—Unisys Corp. sells computers under the name "ClearPath". For explanatory purposes, the architecture is designated as the ClearPath NX. The ClearPath NX is packaged with both MCP environments (this is the Unisys A Series E mode processor) and the "NT" Server side. The NX MCP Environment pertains specifically to the E mode processor side of the architecture exclusive of the NT Server side.
14. Unsolicited Message—A message (data in display or non-display format) which is generated by a concurrent process that is received by a concurrent independent (different) process.
15. Transaction ID i.e., (TRANSACTION ID)—The internal name given to a uniquely generated number passed from MARC to the KSL (Kerberos Support Library) identifying a clients service request. This number will then be attached by the KSL and in turn sent back to MARC such that MARC may route an asynchronous message back to the appropriate client (originator).
16. Networking Host Software—Generalized term for software residing and functioning on the ClearPath NX which provides network communication capability. Software such as the Networking Support Library, Telnet, TCP/IP, HLCN, etc. would be "known" or "thought of" as Networking Host Software.
17. IPX—A communications protocol "Internetwork Packet Exchange".
18. COMS MSG Format—A message consistent with an agreed upon format that COMS (Item #4 of Glossary) recognizes. A message containing a CONS header (information in an agreed upon location and format) and the message portion so that COMS may route the message.
19. Key Distribution Center—Portion of the software residing on the Kerberos Server which processes tasks related to Key(s). A key is a signal code which can be used to access a message which would not ordinarily be accessible.
20. K-Admin—Kerberos Administration/Software on the Kerberos Server responsible for configuration and User administration of the Kerberos Server.
21. DCWRITE—A function construct in DCALGOL used to construct messages and pass messages to an MCS. (Item #3) Reference: A Series DCALGOL Programming Reference Manual form #5014574.380 (May 1989) Page 3–13 and Section 5. Published by Unisys Corporation.
22. NetWare—An operating system developed by Novell, Inc. The NetWare operating system runs in a file server and controls system resources and information processing on the entire network or Internetwork. Reference: "*Concepts*" Novell NetWare 3.12, July 1993. Part Number 100-001715-001.
23. Station Transfer—ClearPath NX terminal service product predicated on an underlying Station Transfer Protocol. Reference: Unisys "A Series Station Transfer Changes for A-EAM," Functional Design Specification 95145/3 Version A, Nov. 2, 1995.
24. GSS-API Library—ClearPath NX support library providing services as defined in Item #6 above.
25. User Data—constitutes a miniature data management system that maintains a database called SYSTEM/USERDATAFILE. The database defines valid usercodes and contains various types of data concerning the User population on a particular ClearPath NX Server.
26. Encryption Library—The DES (Data Encryption Standard) Support Library. The DES Encryption Support Library provides the various encryption algorithms which are needed by the Kerberos protocols. According to [RFC1510] any Kerberos implementation must, at a minimum, support the following encryption algorithm:— DES/CBC/MD5 (DES encryption, using cipher block chaining mode with an MD5 checksum).
27. Directive Command—A Directive Command is a feature of MARC which enables a system to create new commands and make them available to MARC Users. The function of a command is defined by writing a library of ALGOL procedures. The DIRECTIVE command is used in MARC to associate a command name with the procedure. Thereafter, Users can use the new command in the same way as they use any other MARC command. Reference Unisys "*A-EAM Kerberos Directive Commands*," Functional Design, 95057/3 Version B, Aug. 17, 1995.
27a. Directive Interface (DI)—This is the unit which takes advantage of the Directive Command feature. However, when MARC detects that a User request is of a Kerberos nature, MARC hands control over to KSL/DI. The DI parses the Kerberos service requests coming from MARC, verifies the command syntax and calls the appropriate procedures in KSL to process the commands. The advantage of the DI over a Directive command is that there is no need to execute the "Directive Command" to associate a command name (such as KRB) with the procedures, and all of the implementation is centralized in the KSL for case of maintainability.
28. Master Control Program (MCP)—Unisys reference to "*Burroughs Large Systems MCP Manual*"—Release 3.5; May, 1985/Copyright 1985, Burroughs Corporation, Detroit, Mich. 48232. This involves the operating system for Unisys computer systems.
29. Event—An "Event" provides a means to synchronize simultaneously executing processes. An event can be used either to indicate the completion of an activity (this would be how Kerberos is using it, i.e., on the Kerberos Server; and EVENT is changed to a "Happened" state and the KSL is made aware of this change, in this case the response has been formed) or as an interlock between participating programs over the use of a shared resource. From Unisys "*A Series ALGOL Programming Reference Manual Volume* 1: *Basic Implementation*" Release Mark 3.7/July, 1987; Form# 1169844.
30. Key Table File:—This is file which contains the secret key for each application Principal Server. These keys are typically generated by the Kerberos Server and brought over to the ClearPath Server to create the Key Table File.
31. Principal_ID:—This is an identifier that identifies a User in a Kerberized environment. It provides a unique name for a Principal.
32. Replay Detection Option:—This is a command to detect any replay attempts done by using stolen credentials. If the replay detection is "on", it provides recipients of the messages with indicators that the message was recognized as a duplicate of previously-processed message.

GLOSSARY

Kerberos Security Administrative Commands

1. All commands are entered by the client with the Kerberos prefix of "KRB".

2. Commands:
   (a) CLOCKSKEW: This command allows the ClearPath NX security administrator to set the allowable clock-skew used by the Kerberos protocol to accommodate variations in clocks on remote systems, when verifying a ticket. The default clock-skew value is 300 seconds. (Synchronous).
   (b) DEBUG: The DEBUG command does not require special privilege for a User to inquire on the DEBUG option that is currently being set. DEBUG is used to obtain information about KADMIN request(s), procedure entries and exits, etc. This is used as a diagnostic tool. (Synchronous).
   (c) DESTROY: When invoked, the command writes zeros to the specified credentials cache containing the tickets and thereby destroying the tickets. The cache is removed. (Synchronous).
   (d) INIT: Before Kerberos can grant tickets for access to the services of other principals in a network, the User must first log in to Kerberos to obtain a set of credentials consisting of a Ticket Granting Ticket (TGT) and a session key (provided the User has not already logged on to Kerberos and had the TGT forwarded to the ClearPath NX Server). On the ClearPath NX Server, the KRB INIT command provides the means for allowing a User to log into Kerberos to obtain the TGT. (Asynchronous).
   (e) KeyTab: This command allows an appropriately privileged User to inquire the application principals in the Key Table file on the ClearPath NX Server, but not the values of the keys associated with the application principals. (Synchronous).
   (f) LIST: Displays for a User the primary principal and Kerberos tickets held in the credentials cache. (Synchronous).
   (g) LOAD: Allows an appropriately privileged User to load new configuration files into memory immediately or wait until the next Kerberos initialization. (By default files are loaded at initialization). (Synchronous).
   (h) PASSWORD: Allows the client to change his or her password. (Asynchronous).
   (i) PID: Permits the client to inquire on his or her own Principal_ID given his/her ClearPath NX Usercode. (Asynchronous).
   (j) REALM: Returns the realm name for the local host. (Synchronous).
   (l) REPLAY: Allows the appropriately privileged User to inquire, enable, or disable the REPLAY detection option. (Synchronous).

DESCRIPTION OF THE PREFERRED EMBODIMENT

The present command functionality methods and systems involves the Kerberos realm or domain which often denotes that there are number of hosts, servers, and clients connected into a single administrative domain. The general concept for modules which are hosts, servers, or clients, are often designated as "principals". The term "principal" is a term used to denote a uniquely named client or server participating in a network environment. The Kerberos realm or domain, is provided with a Kerberos Server which is a host-server responsible for Kerberos security. The clients, such as client 10 of FIG. 1, are units which may reside in attachment to the network cloud 16 or even within the network cloud. The use of the term "cloud" or the term "network cloud" is a term often proposed by the Novell Corporation, and is used to designate interconnections in a network.

The term "ClearPath" is used to denote a Unisys Corporation system network, wherein different platforms may be connected together, but are also provided with compatible communication protocols and services.

A general overview of a network designated as a Kerberos realm, or Kerberos domain, is shown in FIG. 1. The realm or domain may involve a number of principals such as 10, which may be considered the digital machines, and whereby these principals involve connections to clients or servers that are participating in the domain which is under the control of a particular Kerberos Server, such as Kerberos Server 20 of FIG. 1.

Thus as seen in FIG. 1, a client 10 may be connected through network cloud 16 to both a ClearPath Server 13, and also a Kerberos Server 20. In the ClearPath Server 13, the User Datagram Port (UDP) 15 can be used to connect to the principal or client 10 via the network cloud 16. The network cloud 16 is also connected to the Kerberos Server 20 and the UDP (User Datagram Port) 15 of the ClearPath Server 13.

A "realm" or a "domain" may denote a number of host servers or clients and principals involved in a single administrative domain, often designated as a Kerberos domain. The Kerberos realm can be considered as a term for modules participating in a Kerberos domain. Further, there can also occur a number of different realms or domains which can be interconnected, but which involve another level of complexity.

Figure 2:
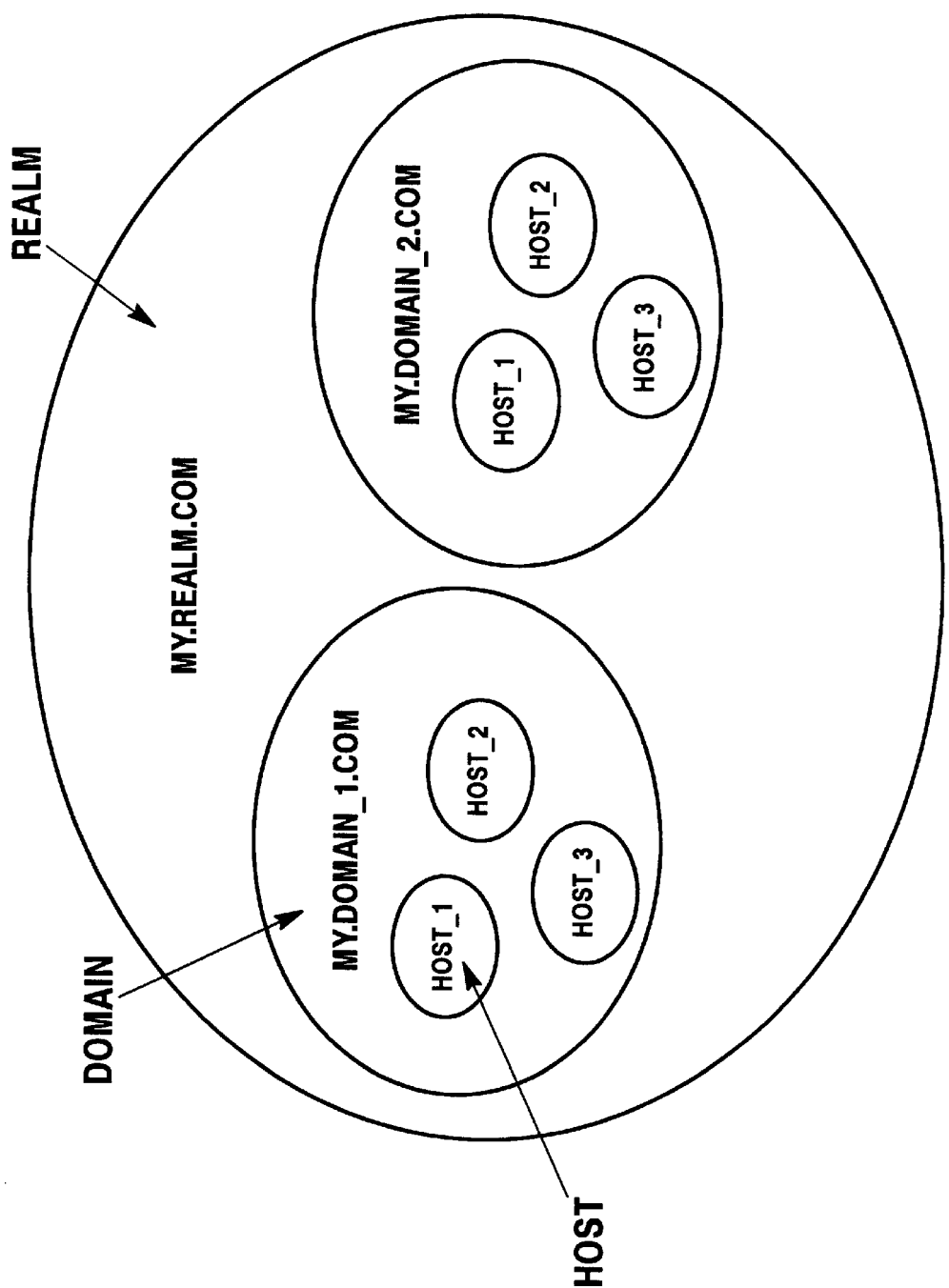
FIG. 2 is a schematic drawing showing the relationship between hosts, a domain and a realm.

FIG. 2 is a schematic illustration of the relationships between a realm, a domain and a host. For example, MY.DOMAIN_1.COM illustrates a particular domain having three different host systems, designated HOST_1, HOST_2, AND HOST_3. Likewise, another domain designated MY.DOMAIN_2.COM illustrates another domain having three host systems. The overall combination of these domains is designated as a REALM and is indicated as MY.REALM.COM. A realm may contain one or more domains and each domain may contain one or more host systems.

Figure 3:
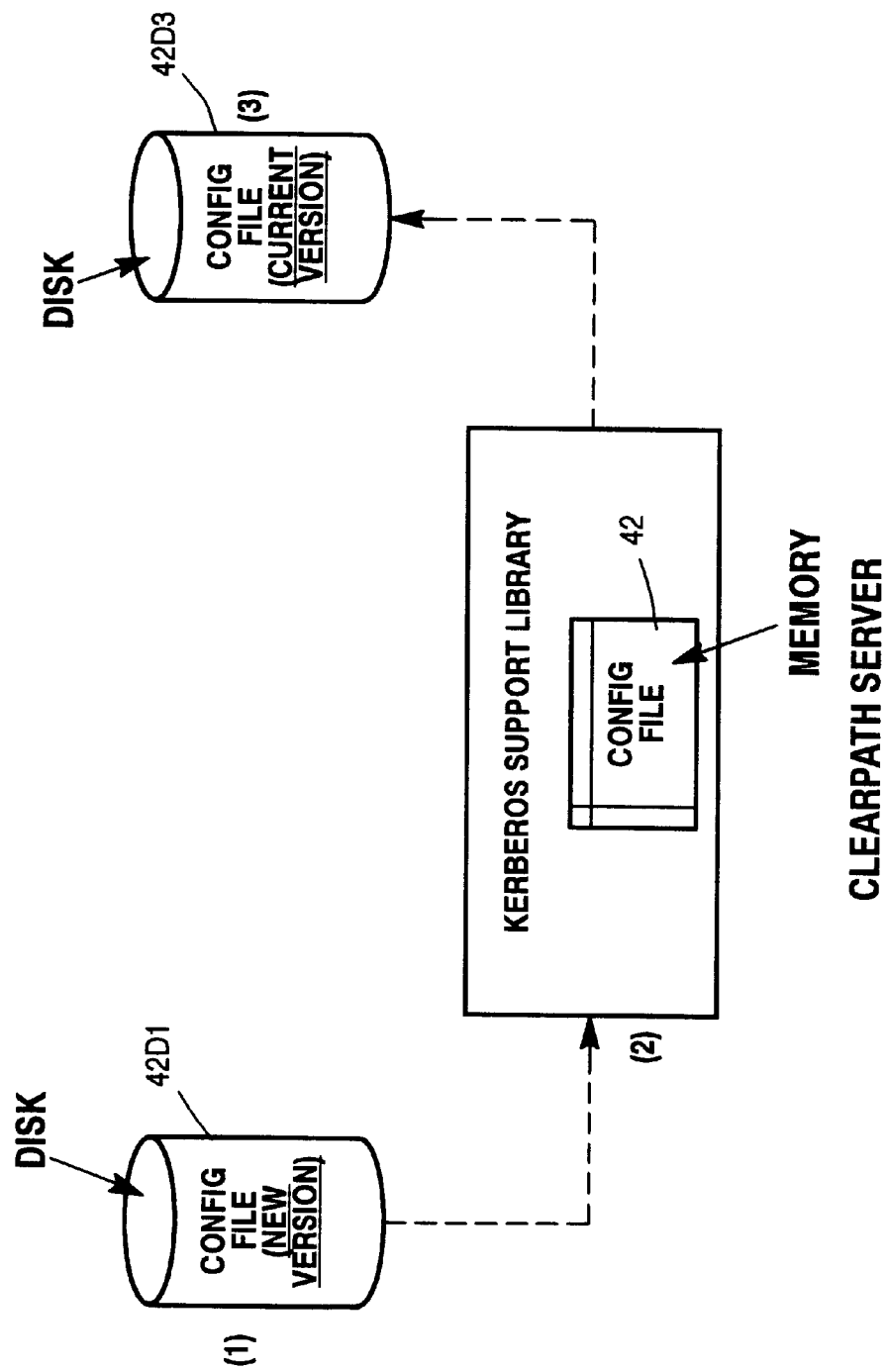
FIG. 3 is a schematic drawing of the relation of the Kerberos Support Library and the configuration file.

FIG. 3 shows a schematic drawing of the Kerberos Support Library 34 utilizing the Configuration file 42. The Configuration file on tape 42T (not shown) is read into file 42 in the KSL 34. After being loaded into memory file 42, the file is then dumped onto a Disk 42D.

The Configuration File memory 42 shown in FIG. 3, is a two-dimensional array which can be sorted so as to facilitate quick retrieval. It should be noted that the "version" of the Configuration File memory 42 that is in the memory array might or might not be identical to that of the version residing on Disk 42D. If the Configuration File tape 42T is updated, then the new data is written to the Configuration File memory 42. At this point, the data in the memory version and that of the Disk version 42D, are not the same anymore. Thus, in order to get these two versions in synchronization, it is necessary to overwrite the disk version 42D3 with the memory version in Configuration File 42. This involves dumping the data from the memory version over to the Disk 42D3 to make the data in both locations to be consistent.

In a newly Kerberized environment, there is a one-time set-up, whereby during the Kerberos initialization period, the Configuration File 42D1 is automatically loaded into the Configuration File memory 42. In essence, any changes that are made to the Configuration File memory 42 are always subsequently dumped into Configuration File 42D3 (Disk), so that these files will be accurate duplicates of each other.

In FIG. 1, the ClearPath Server 13 is shown with a number of its basic functional elements. These include the User Interface 14 which includes the Menu-Assisted Resource Control Program 40 (MARC). This User Interface 14 connects to the Kerberos Support Library 34 which has a Directive Interface 35. Connected to the Kerberos Support Library 34 is a UDP Port 15, a Configuration File 42, a Key Table File 26C, in addition to other interconnections involving the Kerberos Support Library 34 which include a Master Control Program 60, the GSSAPI Support Library 38, the UserData Module 36 and the Encryption Library 32. The Master Control Program (MCP) 60 interconnects to the GSSAPI Support Library (Generic Security Service-Application Program Interface) 38 which interconnects to the User Data Module 36.

Also connected to the Network Cloud 16, which interfaces to Client 10, is the Kerberos Server 20. The Kerberos Server 20 is seen to include a Key Distribution Center KDC 22, a Key Table File 26K, a Kerberos Administrative Module 24 and a Kerberos Database 28. The Key Distribution Center 22 is seen interconnecting to the UDP Port 15 of the ClearPath Server 13.

As seen in FIG. 1, the User Interface 14 and its Menu-Assisted Resource Control Program (MARC) 40 communicates with a Kerberos Support Library (KSL) 34 which contains the Directive Interface (DI) Module where DI is the interface between MARC 40 and KSL 34.

The Directive Interface 35 is the interface between the Menu-Assisted Resource Control 40 and the Kerberos Support Library 34 whereby the Directive Interface 35 parses the Kerberos Service Requests coming from MARC 40, then verifies the command syntax and then calls the appropriate procedures in the Kerberos Support Library (KSL) 34 to process the commands.

All network communications to the Key Distribution Center 22 (KDC) is through the Universal Data Port (UDP) Port File 15 which has a port number designated "88." The UDP Port File Interface is an internal interface available only for system libraries.

The Kerberos Server 20 (KS) is a third party Kerberos Server running on other platforms such as UNIX and the Kerberos Server 20 will include the following components:

i) A KDC (Key Distribution Center) 22 involving software on the Kerberos Server which processes tasks related to Keys;

ii) K-ADMIN 24 (Kerberos Administration Server):— This is a protocol on the Kerberos Server responsible for configuration and user administration;

iii) Kerberos Database 28:—This is a repository for user information;

iv) Key Table File 26K:—This is a file which contains the secret key for each application principal server. These keys are typically generated by the Kerberos Server 20 and brought over to the ClearPath Server 13 to create the Key Table File 26C.

As seen in FIG. 1, the ClearPath Server 13 has a number of elements which are functionally described as follows:

a) The User Interface 14:—This interface uses the Menu-Assisted Resource Control Program 40 (MARC) as a standard user interface in order to make a Kerberos Service Request.

b) The Kerberos Directive Interface 35:—This is a module within the Kerberos Support Library 34 which provides the syntactic verification of input from MARC 40, then requests information and routes the response back to MARC 40 to be displayed to the user once the processing is done.

c) Encryption Library 32:—This is software that provides algorithms for encryption and decryption.

d) User Data Module 36:—This is a file that provides the mapping between the UserCode and the Principal ID. UserCode is an identifier that identifies a User on the Unisys ClearPath system.

e) Generic Security Service Application Programming Interface (GSSAPI) Support Library 38:—This application program interface is used to facilitate the development of User written applications that desire to use Kerberos for authentication and encryption.

f) Master Control Program 60 (MCP):—This is the system software that provides, among other things, the User privilege information.

g) Key Table File 26C:—This is a file that contains the secret key for each application principal server which is a Principal_ID to identify an "application name", as opposed to the Principal_ID which identifies a Client-User. These keys are typically generated by the Kerberos Server 20 and brought over to the ClearPath Server 13 to create the Key Table File 26C.

h) configuration File 42:—The Kerberos operating configuration is dependent upon one or more configuration files which reside in all the server and client systems in the network. The number of files will depend upon the file format used. These files contain configuration information describing the default Kerberos Realm and the location of the Kerberos Key Distribution Centers (KDCs) for the known realms.

i) UDP Port (User Datagram Protocol) 15:—All the network communications to the KDC 22 are done through the UDP Port File 15 Interface using a designated port number as number "88." The UDP Port File Interface 15 is an internal interface which is available only for system libraries.

Now referring to the functional operation of FIG. 1, the Menu-Assisted Resource Control Program 40 (MARC) provides a User interface that enables a User to make a Kerberos Service Request. The Kerberos Support Library 34 (written in NEWP as a system library) implements the operation of the Kerberos functionality. NEWP is a programming language. The Kerberos Support Library implements the necessary parts of the Kerberos protocol designated K-Admin 24 (Kerberos Administration Server) client protocol and other relevant data structures. The Kerberos Support Library interfaces with the GSS-API Support Library 38 so that any applications can make use of the GSS-API calls in order to initiate and accept the security context, and to exchange authenticated and confidential data. The KSL Library includes the routines to communicate with the Kerberos Server 20 through the UDP 15.

In FIG. 1, the Directive Interface 35 (DI) Module is an interface between MARC 40 and the Kerberos Support Library 34. The Directive Interface parses the Kerberos Service Requests coming from MARC 40 and then verifies the command syntax and then calls the necessary procedures in the Kerberos Server Library 34 in order to process the commands. The GSSAPI Support Library 38 provides the call back routine that can be used by the Kerberos Support Library 34 in order to return tokens and other responses. The Encryption Library 32 provides the routines for encryption/decryption in addition to checksum computation.

The Master Control Program 60 (MCP) will restrict access to the Key Table only to the Kerberos Support Library 34 and the MCP provides memory management changes to prevent "secure" data from being dumped during program dumps. The MCP also facilitates asynchronous message traffic from the Kerberos Support Library 34 to the MCP 60.

The UserData file 36 provides the mapping between the ClearPath UserCode and the Kerberos Principal_ID.

The Key Table File 26K in the Kerberos Server 20 contains the secret key for each application principal server. These keys are generated by the Kerberos Server 20 and brought to the ClearPath Server to create the Key Table File 26C.

The Configuration File 42 of FIG. 1 contains the configuration information which describes the Default Kerberos Realm and the location of the Kerberos Key Distribution Centers (KDCs) for the known realms. The UDP Port File Interface 15 is an internal interface available only for system libraries. All the network communications to the Key Distribution Center 22 is done through the UDP Port File 15 Interface using the port number designated "88."

The present disclosure focuses on and describes the functionality of the new Kerberos commands and their utilization. The MARC program capability is only discussed as a standard User interface to be used in making Kerberos requests. Other methods are also possible.

Regarding FIG. 1, there is involved a Client 10 who is operating on the Unisys ClearPath system. The client-User chooses the program MARC 40 to make a Kerberos service request.

Regardless of the method the client-User chooses, the Kerberos Support Library (KSL) 34 will eventually receive the Kerberos Service Request through the Kerberos Directive Interface 35 (KDI). Depending upon the type of service request, the Kerberos Support Library (KSL) 34 will then contact the required modules and data in order to retrieve the response and return the response to the client-User in the network.

Figure 3A:
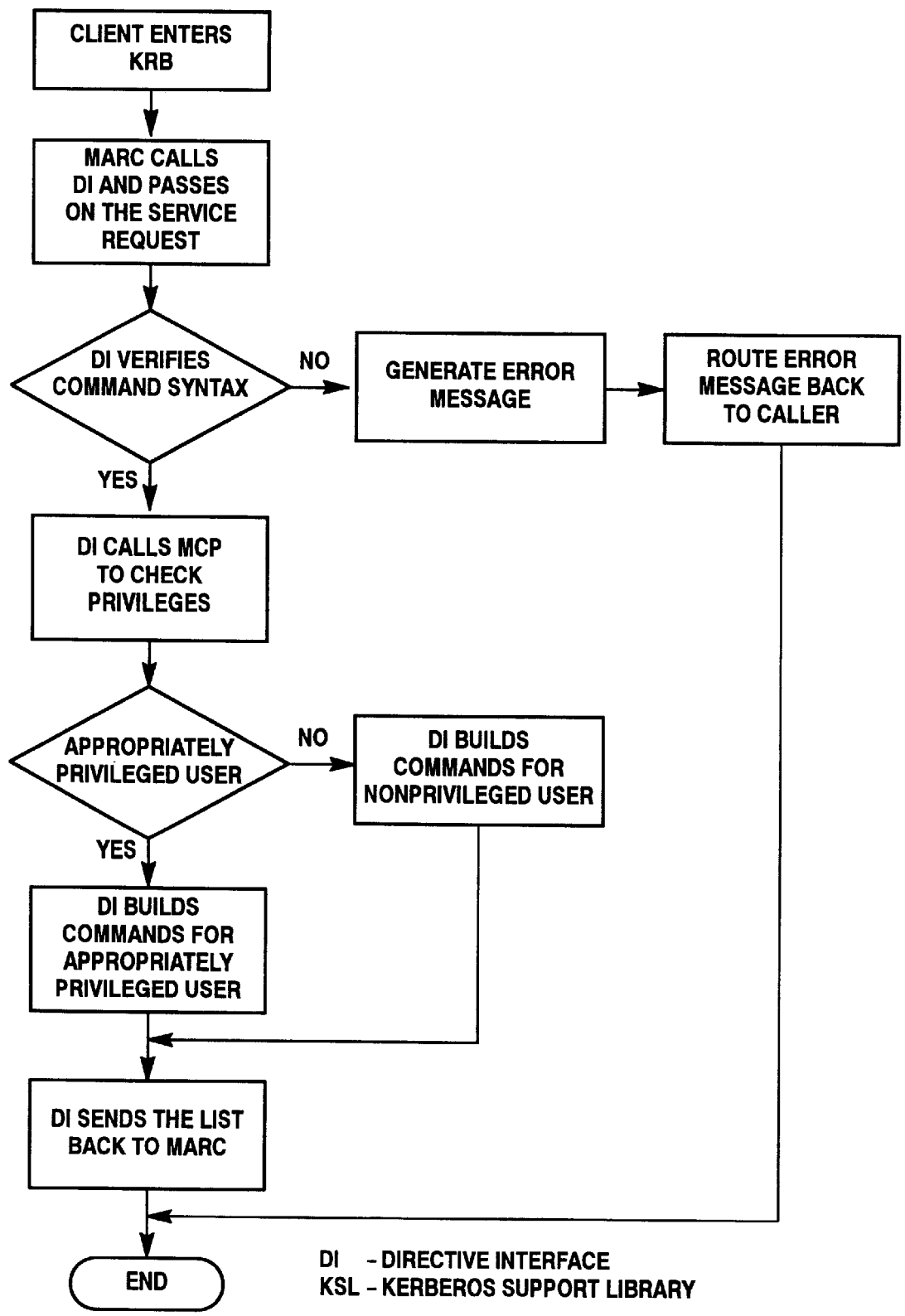
FIG. 3A is a flow chart illustrating the KRB function, whereby the User can inquire as to the type of Kerberos commands available for the User's privileges.

Referring to FIG. 3A, there is indicated the functionality of the new command "KRB," which allows a ClearPath system User to inquire as to a list of the Kerberos Commands.

Now the User wants to inquire regarding a list of the Kerberos commands, and in so doing, he types in the Kerberos command KRB.

The caller (MARC) makes this service request through the Kerberos Directive Interface (KDI) 35 in the Kerberos Support Library 34.

The Directive Interface (DI) 35 checks the request for the command syntax and if there is an error, it will generate an error message and route it back to the caller (MARC).

Then the DI 35 calls MCP 60 to check for the privileges of the User. If the User does not have the appropriate privileges, then DI 35 will build a list of Kerberos commands for the non-privileged User.

If the User has appropriate privileges, then DI 35 will build a list of Kerberos commands for an appropriately privileged User, and send the list back to the caller (MARC), after which the program comes to an end (END).

Figure 3B:
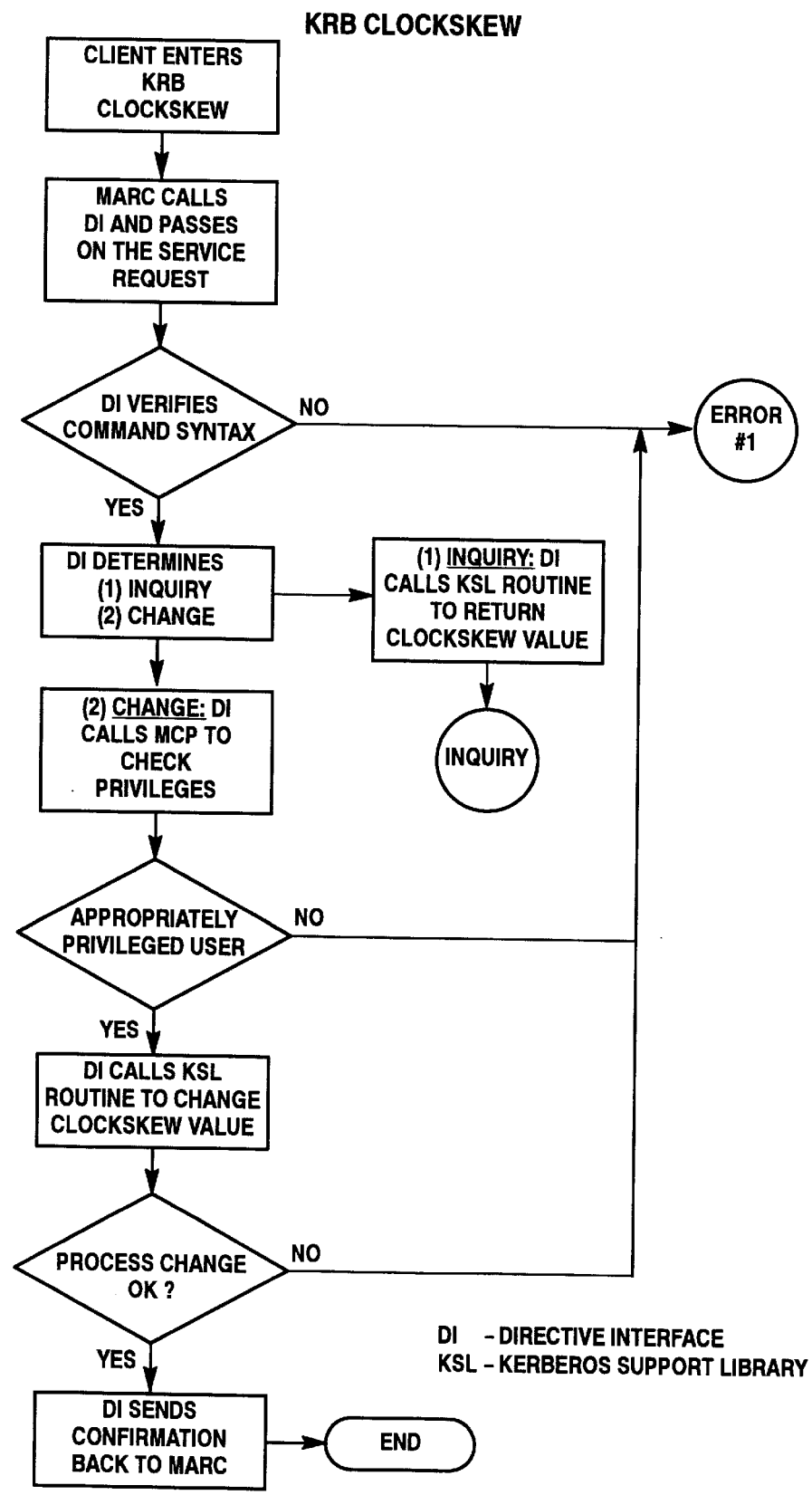
FIG. 3B is a flow chart diagram of the KRB clockskew command which allows a User to view and change the clock-skew value.

FIG. 3B is a flow chart indicating the command function for developing the KRB ClockSkew. The implementation of this command allows a ClearPath system User to inquire the ClockSkew value and/or to change the Clock Skew value.

From MARC, the User wants to inquire and/or change the ClockSkew value. User types in the Kerberos command KRBCLOCKSKEW. The caller (MARC) makes this service request through the Kerberos Directive Interface 35 (KDI) in the Kerberos Support Library 34 (KSL).

As seen in FIG. 3B, the Directive Interface 35 then checks for the proper command syntax. If there is an error here, then the sequence will generate an error message and route it back to the caller (MARC).

If the request is a "Change request", (2) the Directive Interface 35 calls MCP 60 for the privileges involved. If the User does not have the appropriate privilege, then the sequence will go to the step for generating the error message and routing it back to the caller (MARC) as will be seen in FIG. 4.

Figure 4:
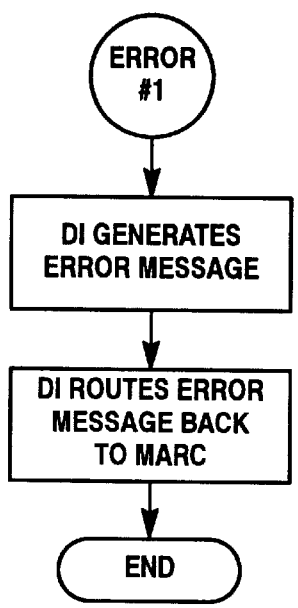
FIG. 4 is a flow chart illustrating the steps for the error routine.
Figure 4A:
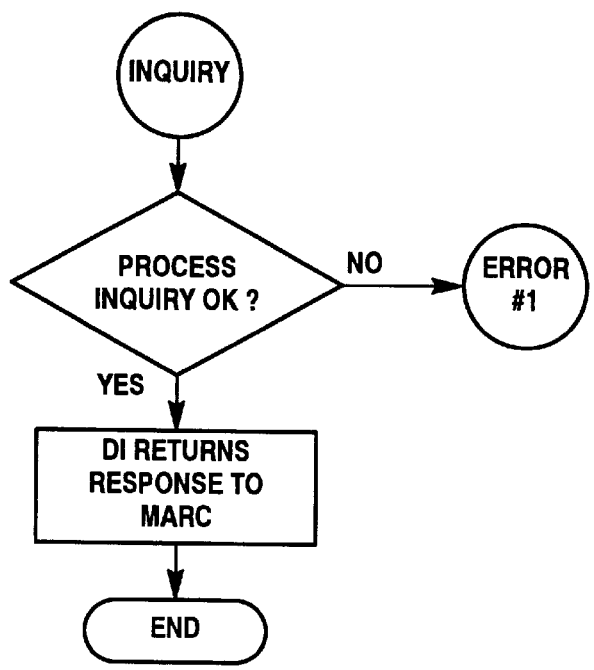
FIG. 4A is a flow chart illustrating the inquiry routine.

If the request is an inquiry request, (1) and the request is processed in normal order, as seen in FIG. 4A, then the sequence will jump to route the response back to the caller (MARC), and then END the sequence. If the Inquiry request (1) is not processed properly, then the sequence will go to generate the "error message" and route it back to the caller (MARC). On the Change request (2), if the User does have the proper privilege, then DI 35 calls the KSL 34 to change the clockskew value. When this is done properly, then the DI 35 sends a confirmation back to MARC 40.

Figure 3C:
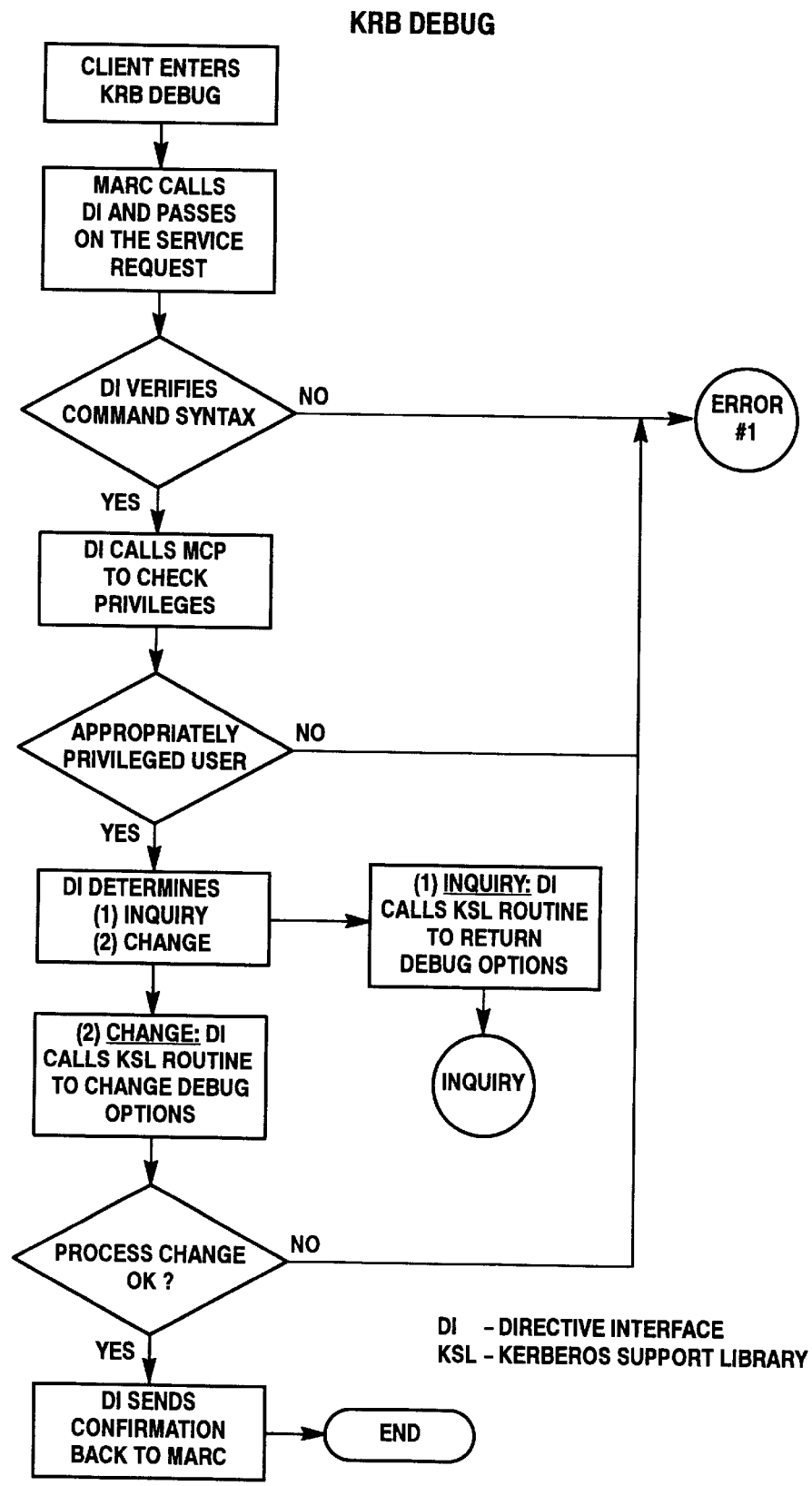
FIG. 3C is a flow chart of a command designated KRB Debug, which allows a User to view and change the Debug option.

Now referring to FIG. 3C, there is described the command function designated KRB DEBUG. This command function allows a ClearPath system User to inquire about and/or change the "DEBUG" options which are currently being set. FIG. 3C is flow chart illustrating the various sequential steps involved in processing this command to effectuate the desired result.

Here, a User on the ClearPath system (at the client terminal 10) chooses to make a Kerberos service request. In this case, the User wants to inquire and/or change the DEBUG options which are currently being set. The User types in the Kerberos command KRB DEBUG.

In this case now, the caller (i.e., MARC 10 calling the Kerberos Support Library 34) makes this particular service request through the Kerberos Directive Interface (KDI) 35 in the Kerberos Support Library 34 (KSL). The Directive Interface 35 checks this for proper command syntax. If an error occurs here, then the sequence will generate an error message and route it back to the caller.

Now the Directive Interface 35 calls MCP 60 to check a User's privileges. If the User does not have the proper and appropriate privileges, the sequence will go to generate an error message and route it back to the caller (MARC).

If this particular request is a "Change Request", (2) the sequence will proceed to operate as a change request after which the process for change will occur. Here, the DI35 calls the KSL 34 routine to change the DEBUG option as indicated by the User who makes the request. After KSL 34 changes the Debug option, this will be verified as being okay, after which a confirmation is sent back to the caller (MARC) and the sequence will end.

If it is merely an Inquiry (1) which is processed in an appropriate manner, the sequence will let the DI 35 call the KSL 34 routine to return the debug options and then go and route the response back to the caller (MARC) and then END the sequence.

Figure 3D:
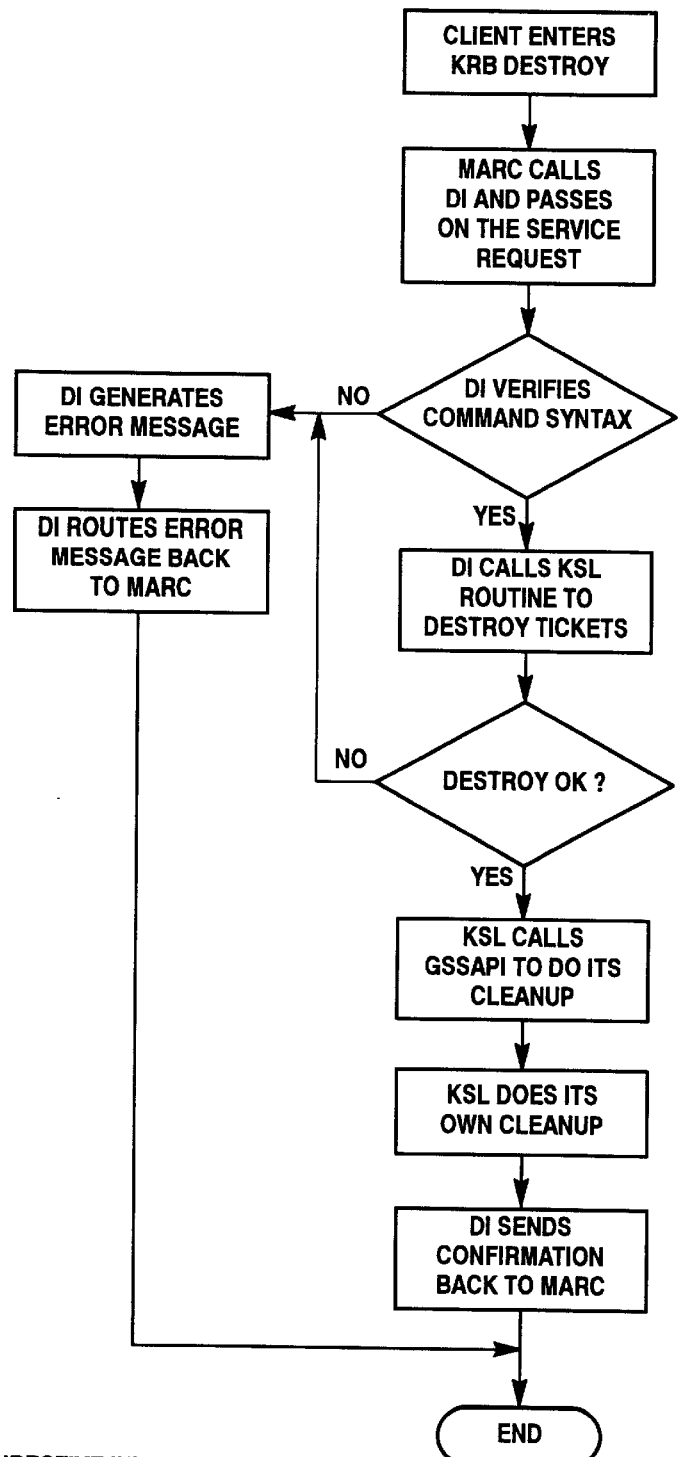
FIG. 3D is a flow chart showing the command function designated KRB DESTROY, which allows a User or Users to destroy their active tickets.

Referring to FIG. 3D, there is indicated a flow chart for the accomplishment of the command designated KRB DESTROY, which command allows a ClearPath User to destroy his or her active tickets. The User must logon to the Kerberos Server prior to executing this command.

Here, a ClearPath system User chooses a method to make a Kerberos service request.

The present Enterprise Access Management System project can support four different methods or different ways for a User to make a Kerberos Service Request. This can involve:

(i) MARC Command Line;
(ii) MARC Screen Selections;
(iii) A system command by the Operator Display Terminal ODT or the SPO (Single Point Operation);
(iv) Application Programs.

In the particular system and method described in the present disclosure, the focus and concentration will only involve the MARC command line (I) as a User interface for the Kerberos system.

Here, a User desires to destroy his/her "active tickets". The User then types in the Kerberos command:—(KRB DESTROY).

The caller (MARC 40) makes this service request through the Kerberos Directive Interface 35 in the Kerberos Support Library 34. The Directive Interface 35 checks this command for the proper command syntax, and if there is an error, will then generate an error message and route it back to the caller (MARC).

If the checkout for command syntax is appropriate, then the Kerberos Support Library 34 processes the request. Again, if there is an error in processing this request, an error message is generated and routed back to the caller.

Now, the Kerberos Support Library 34 does its own clean-up operation. The clean-up operation involves the removal of any credential handle (which is a reference to the Ticket-Granting-Ticket from the credential structures). Once a Ticket-Grant-Ticket (TGT) is no longer available, then any reference to that Ticket in the credential structure is removed to make room for more data. This type of operation occurs in the Kerberos Support Library 34 and the GSS-API Library 38.

The Kerberos Support Library 34 has a credential structure which stores information as to the attributes associated with the Ticket Credential Handle (this involves name of User, current time, duration of validation, name of workstation, DES session key). DES represents Data Encryption Standard. The "session key" is the key known only to the client-user and the Server. It is used to authenticate the client to the Server.

Here, the Kerberos Support Library 34 calls the GSSAPI Support Library 38 in order to effectuate the clean-up operation there. The GSSAPI refers to the Generic Security Service Application Program Interface. The result here is to clean-up the Kerberos Support Library 34, after which a confirmation is sent by DI 35 back to the caller (MARC) and the sequence comes to the END.

Figure 3E:
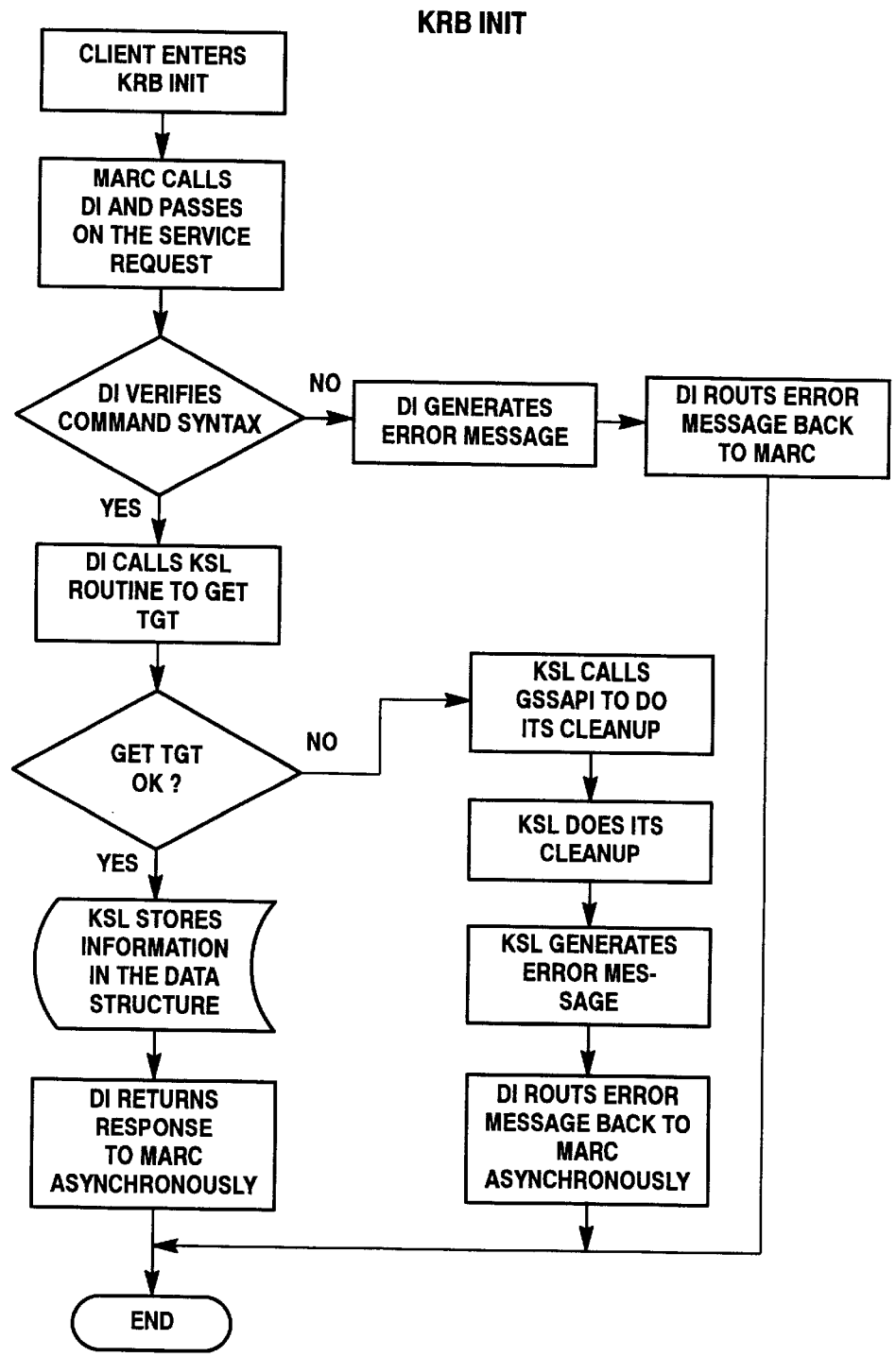
FIG. 3E is a flow chart illustrating the functional command of KRBINIT, which allow the User to logon and obtain the Ticket Granting Ticket (TGT)

FIG. 3E is a flow chart illustrating the sequential steps involved for effectuating the command designated KRB INIT. This command allows a ClearPath system User to login to the Kerberos Server 20 in order to obtain the ticket granting. Thus, a ClearPath system User then enters a Kerberos service request from MARC. The User wants to login to the Kerberos Server 20 to obtain the Ticket Granting Ticket (TGT) function in the Key Distribution Center, KDC 22, FIG. 1. The User initiates by typing in the Kerberos command KRB INIT.

The caller (MARC 40) makes this service request through the Kerberos Directive Interface 35 (KDI) in the Kerberos Support Library 34 (KSL). Again, the Directive Interface 35 then checks the command for appropriate command syntax and if there is an error, it will generate an error message back to the caller (MARC).

Absent any error in the command syntax, then the Directive Interface 35 calls the Kerberos Support Library 34 to process this request for TGT and store the required information. This sequence will route the response back to the caller 40 (MARC) on an asynchronous basis, and this will END the sequence. The Menu-Assisted Resource Control Program 40 (MARC) will then display the following asynchronous generic response:—processing requests.

If an error occurs, then MARC 40 will display one of the following responses:
(i) The INIT command (Kerberos authentication) could not be completed because the MCS interface (Message Control System which could be the MARC 40) failed to provide the dialog attribute;
(ii) The INIT command (Kerberos authentication) could not be completed because the MCS interface failed to provide the transaction number attribute;
(iii) The INIT command (Kerberos authentication) could not be completed because more than three tokens were provided;
(iv) The INIT command (Kerberos authentication) may only be entered using an MCS, such as MARC;
(v) The INIT command (Kerberos authentication) requires at least the Principal-Name and password to be supplied;
(vi) In the INIT command, a password must be supplied in addition to the Principal-Name.

The Kerberos Support Library 34 will then do its own clean-up operation. It then calls the GSSAPI 38 to do the clean-up on its area.

After the Kerberos Support Library 34 is cleaned up, KSL 34 will generate an error message, and the error message be routed back to the caller (MARC) on an asynchronous basis. Then, this sequence will be at the END point.

Certain KEYTAB functions are now described in FIG. 3F1 for the KRB KEYTAB INQUIRY, and in FIG. 3F2 which illustrates the sequential steps for the KRB KEYTAB LOAD command, and where FIG. 3F3 shows the sequence for effectuating the command designated RRB KEYTAB EXTRACT.

Referring to FIGS. 3F1, 3F2, 3F3, there is indicated the basic command KRB KEYTAB which applies to a Clear-Path system User who has chosen a method to make a Kerberos service request. Here, the User wants to logon to the Kerberos Server 20 in order to enable the following:
(i) FIG. 3F1 inquires (Inquiry Request), about the application principals in the Client-Servers Key Table File, 26C (FIG. 1) but not the value of the keys associated with the application principals. The Key Table File 26C is owned and maintained by the Kerberos Support Library 34. The Key Table File 26C contains the secret key for each application principal server. These keys are typically generated by the Kerberos Server 20 (KS) and brought to the ClearPath Server 13 to create the Key Table File 26C. The secret key associated with each of the application principals must not be displayed for reasons of security;
(ii) FIG. 3F2 loads (Load Request) the Key Table File, (which was previously created on a UNIX Kerberos Server 20) and loads this Key Table File to the Clear-Path Server 13 from tape. The Kerberos Server 20 is a third party product running on the UNIX platform. The ClearPath server 13 is a Unisys Corp. system network wherein different platforms may be connected together but are also provided with compatible communication protocols and services;
(iii) FIG. 3F3 extracts (Extract Request) the Key Table File (which was created on the UNIX Kerberos Server) and sends it to the ClearPath Server 13 across the network. The Kerberos Server 20 is a third party product running on the UNIX platform.

The User types in the Kerberos command regarding FIG. 3F1(i); FIG. 3F2(ii); or FIG. 3F3(iii). Then, the caller (MARC 40) makes this service request through the Kerberos Directive Interface 35 into the Kerberos Support Library 34. The Directive Interface 35 checks this command for the proper command syntax, and if there is an error, will generate an error message and route it back to the caller (MARC).

If the service request is proper and appropriate, and if it is an "inquiry request", FIG. 3F1(i) then the sequence of operation will be shown in FIG. 3F1.

If the request is a "Load Request", FIG. 3F2(ii) the sequence of operation will be shown by the flow chart of FIG. 3F2.

If the request is an "Extract Request", FIG. 3F3(iii) then the sequence of operation will be shown in FIG. 3F3.

Now, referring to item (i) 3F1 above regarding "inquiring" as to the application principals in the Key Table File. Here, there is a Key Table (KT) inquiry, which is illustrated in FIG. 3F1, and here it is seen that the inquiry KRBKEYTAB is processed by MARC calling DI 35 to pass on the request which then checked for validity to see if the inquiry was properly developed syntactically. If not, an error signal is sent back to the caller (MARC). Now, assuming the inquiry process was developed properly, then the information is built by the Directive Interface 35 which extracts and builds a response from the Key Table File 26C. This involves DI 35 calling the KSL routine 34 to get the following information:—key table version; principal ID; principal type; number of keys; time stamp; key version; encryption type; and key length. The Directive Interface then takes the response and sends it to MARC 40 (caller) who in turn displays it to the User who made the request after which the sequence is brought to an end.

Now, referring to item (ii), FIG. 3F2 above which involves loading the Key Table File. This sequence is described in the Flow Chart of FIG. 3F2. Here, the Client-User enters KRB KEYTAB LOAD whereupon MARC 40 calls DI 35 and passes the service request. Then DI 35 checks for the propriety of the command syntax. If there is an error, then the sequence will generate an error message, and route it back to the caller (MARC 40). Now assuming the command syntax is appropriate, the Directive Interface calls MCP 60, then checks for the User's privileges. Again, if the User does not have the appropriate privilege for access, then the sequence will generate an error message and route it back to the caller.

Figure 5:
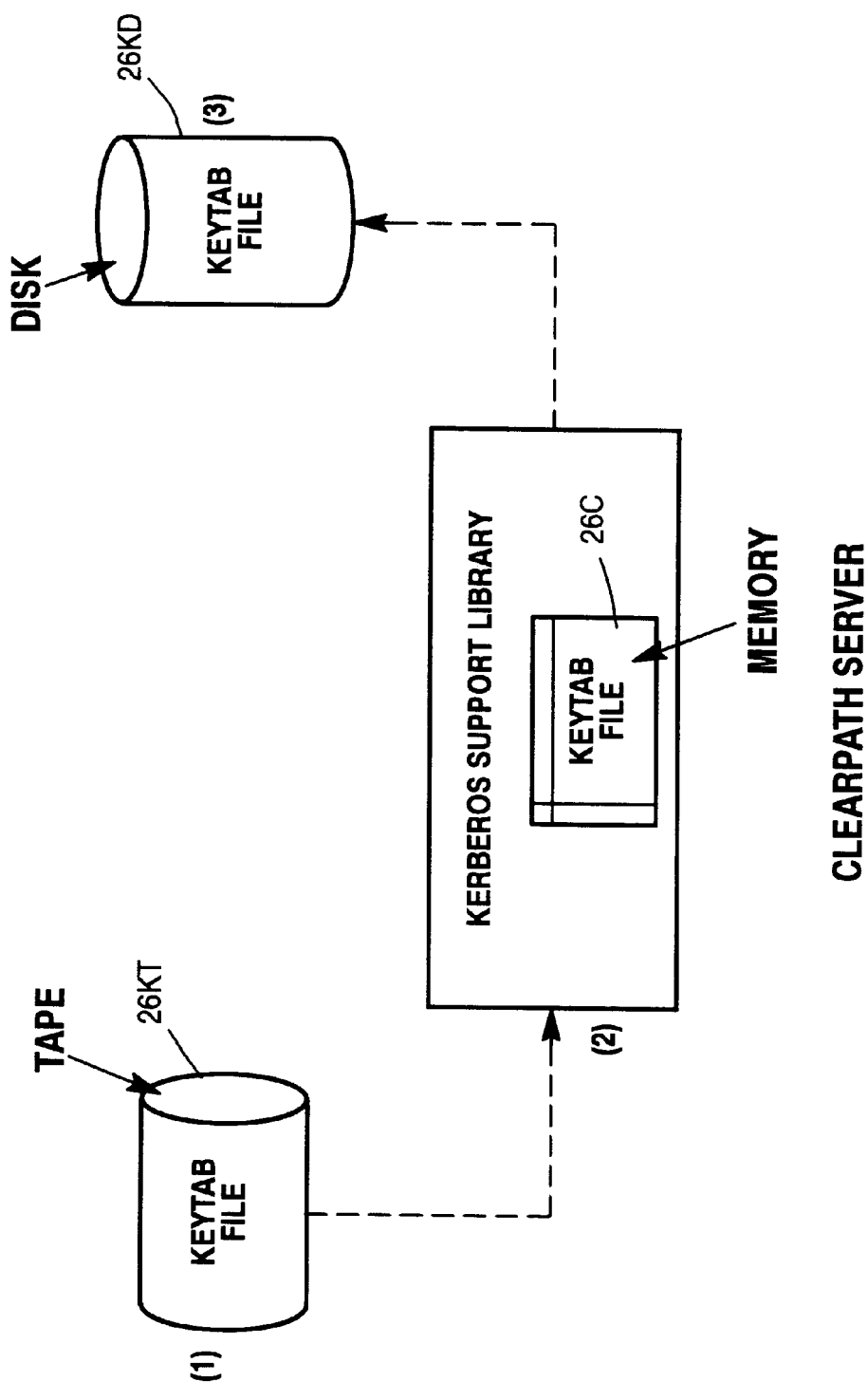
FIG. 5 is a schematic drawings showing the loading and storage for the Key Table File.

Now assuming that the User is appropriately privileged, this Load sequence will then load the Key Table File, 26C from 26K. The Key Table File was orginally created on the Kerberos Server 20. It is necessary to propagate the information from the Key Table File 26K on the Kerberos Server 20 over to Key Table 26C in the ClearPath Server 13. One of the secured methods of doing this is copying the Key Table File onto a QIC Tape and then unloading this into the ClearPath Server 13. A QIC Tape is a media that is supported on the UNIX platform and the ClearPath platform. A Key Tab Load command copies the Key Table File 26K from a tape 26KT, FIG. 5 and then onto the ClearPath Server 13 at the Key Table File 26C. Then subsequently, this Key Table File is dumped onto disk 26KD, FIG. 5. In the absence of an error, the Directive Interface 35 routes the following response to MARC 40 for display to the User as follows:

"Keytab<filename>loaded/added"

Now regarding item (iii), FIG. 3F3 which involves extracting the Key Table File, the sequence involved here is shown in FIG. 3F3. The Client-User enters the command KRB KEYTAB EXTRACT. MARC 40 calls the Directive Interface 35 (DI) and passes on the request. If an error occurs, there will be generated an error message which is routed back to the caller (MARC 40).

The next step of operation involves DI 35 calling MCP 60, to check for the privileges available to the User. If the User does not have the appropriate privilege, then there will be generated an error message which is routed back to the caller (MARC).

Assuming that the User is found to be appropriately privileged, the KSL 34 will then extract the Key Table File 26C. If this is accurately done, the DI 35 sends confirmation to MARC 40.

Another secured means of bringing the Key Table File 26K (of Kerberos Server 20) into Key Table file KT 26C of the ClearPath Server 13, is over the network via the Network Cloud 16. The Keytab extract command copies the Key Table File 26K from the Kerberos Server 20 over to the ClearPath Server 13 through the Network Cloud 16. A typical command for this is shown as follows:

"ExtractKeyTableFile;sourcefile=<filename>;

destination file=<file name>

Then the response is developed back to the caller (MARC 40) on an asynchronous basis. This then ENDS the sequence.

Figure 3G:
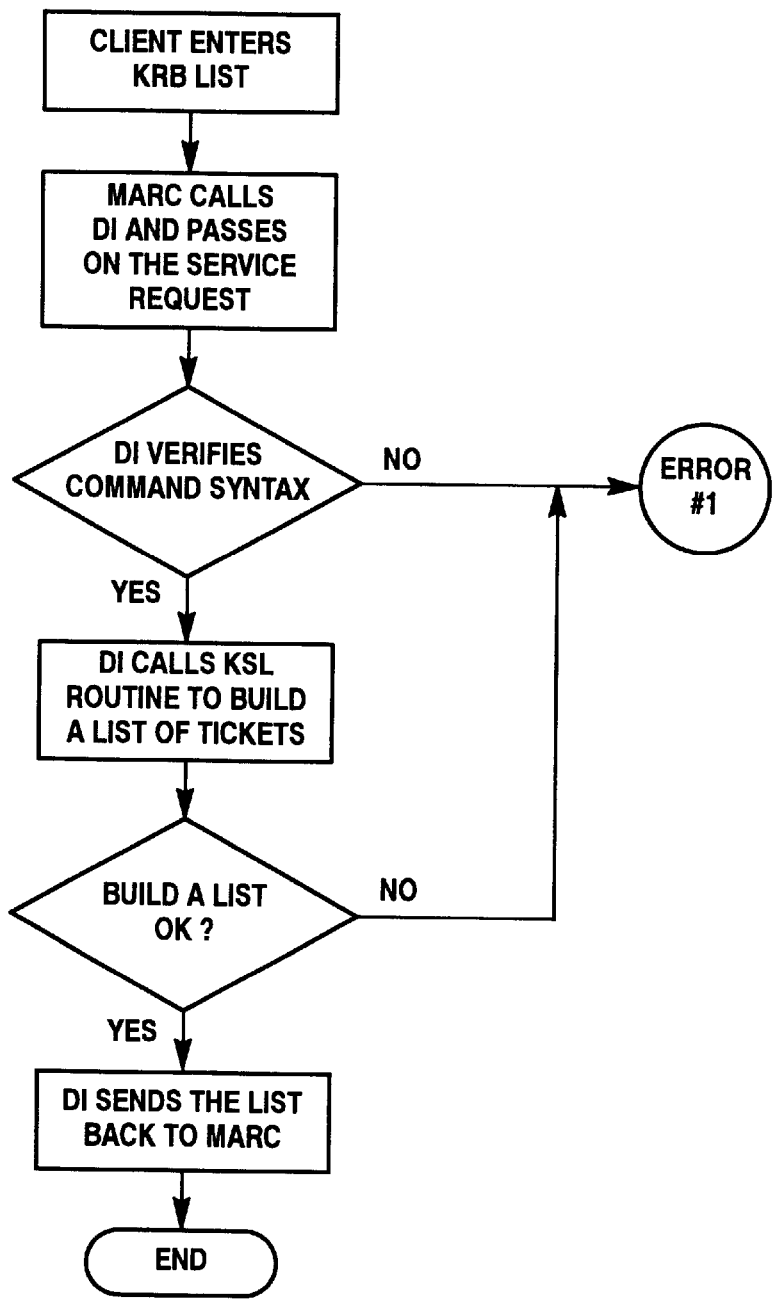
FIG. 3G is a flow chart illustrating the command function designated KRB LIST, which allows a ClearPath system User to list the tickets in his ticket cache.

Referring to FIG. 3G, there is shown a flow chart for the implementation of the Kerberos command designated as KRB LIST. This allows a ClearPath system User to list the tickets in his or her ticket cache. A ticket cache is a ticket structure in the Kerberos Support Library 34 which maintains this ticket structure. Now, prior to executing this command, of course, the User must logon to the Kerberos Server 20.

The sequence (FIG. 3G) for the KRB LIST command is initiated by typing in the Kerberos command KRB LIST, since the User wants to list the tickets in his ticket cache. The caller (MARC 40) then makes this service request through the Kerberos Directive Interface 35 (DI) in the Kerberos Support Library 34. The Directive Interface 35 then checks this command for the appropriate command syntax. If there is an error, it will generate an error message and route it back to caller, MARC 40 (Error #1, FIG. 4).

Likewise, if there is an error in processing this request, there will be the generation of an error message which is routed back to the caller (MARC).

Here, assuming the command syntax is appropriately generated (YES), DI 35 calls KSL 34 routine to build a list of tickets (in the KSL 34 Ticket Cache) which is then checked to see that the list is free of error, after which the list will be sent back to the caller (MARC 40) and the sequence will come to a conclusion at the END.

Figure 3H:
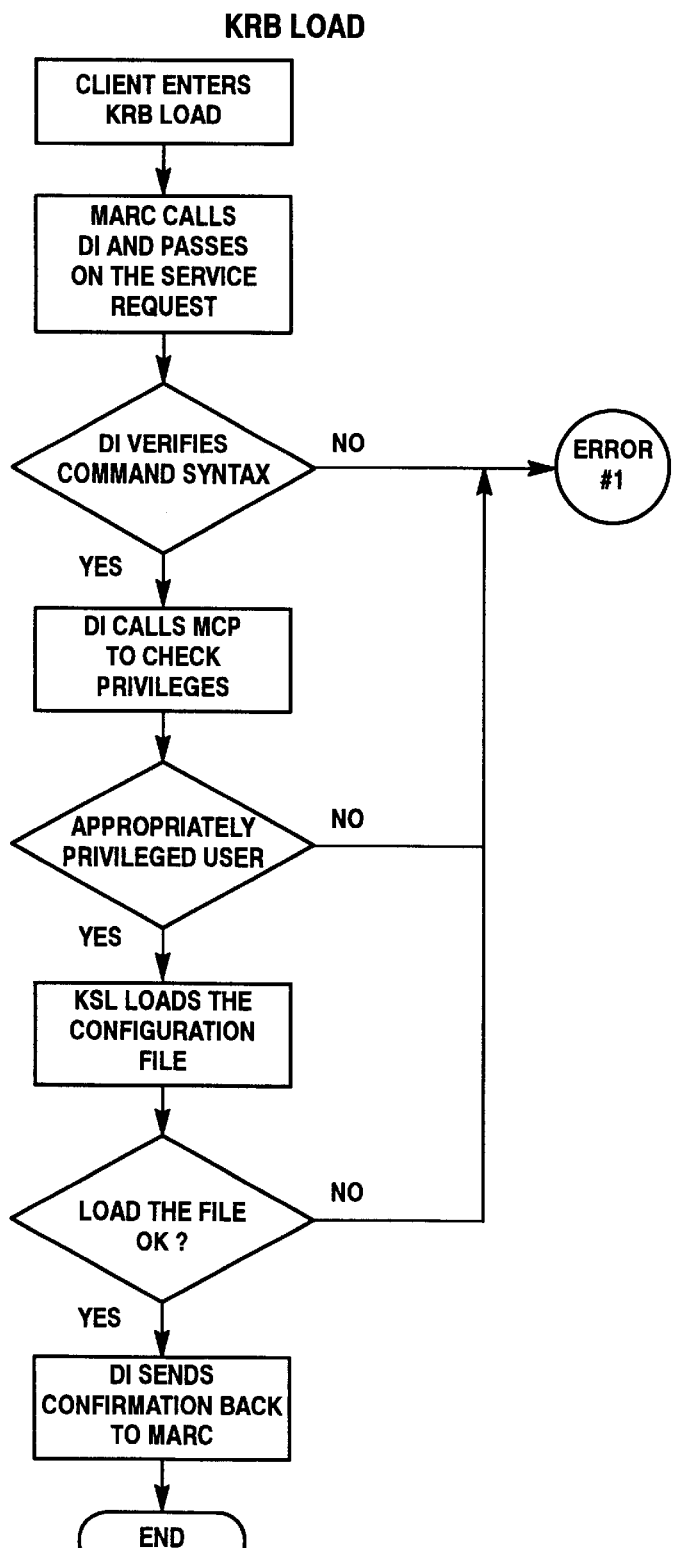
FIG. 3H is a flow chart illustrating the command function designated KRB LOAD, which allows a User to load a new configuration file into configuration file memory.

FIG. 3H is a flow chart illustrating the implementation of the command designated KRB LOAD, which allows a ClearPath system User to load a configuration file into Configuration File Memory 42. This was described in connection with FIG. 3. The Kerberos configuration is dependent upon one or more Configuration files which reside on all server and client systems in the network. The number of Configuration files will depend upon the format used. These files contain configuration information describing the default Kerberos realm and the location of the Kerberos Key Distribution Centers (KDC,22) for the known realms. An accurate configuration of these files is a critical component to Kerberos operability.

Referring to FIG. 3H, a ClearPath system User chooses a method to make a Kerberos service request. The User wants to load (KRBLOAD) a configuration file into Configuration file Memory, 42, (FIG. 1; FIG. 3). The ultimate goal of the KRBLOAD command is to load the Configuration file 42 onto Disk 42D3 (FIG. 3) on the ClearPath Server 13. However, this system does not perform a Read/Write to disk instruction each and every time, as this would involve an expensive overhead operation. What is done is to write to memory, and once all the Read/Write instructions are done, there will be a Write to Disk in one operation. Here, the User types in the Kerberos command-KRB LOAD.

This service request is then initiated by the caller (MARC 40) through the Kerberos Directive Interface 35. Here again, the Directive Interface checks for appropriate command syntax and then calls MCP 60 to check for the User's appropriate privileges. If the User has the appropriate privilege, then the sequence of FIG. 3H will load the Configuration File 42D1, FIG. 3 into Configuration Memory 42. After this, a response is routed by DI 35 back to the caller (MARC 40). MARC will display one of the following messages to the User:

"Load INI file now; file name=<file name>"
"Load INI file later; file name=<file name>"
"Load CONFIG file now; file name=<file name>"
"Load CONFIG file later; file name=<file name>"
"Load REALM file now; file name=<file name>"
"Load REALM file later; file name=<file name>"
"Load CONFIG/REALMS files now; config file=<file name>; realm file=<file name>"
"Load CONFIG/REALMS files later; config file=<file name>; realm file=<file name>"

In each of the last three step sequences of FIG. 3H, if any error should occur, then an error message is generated and routed back to the caller (MARC), as was indicated in FIG. 4.

Figure 3I:
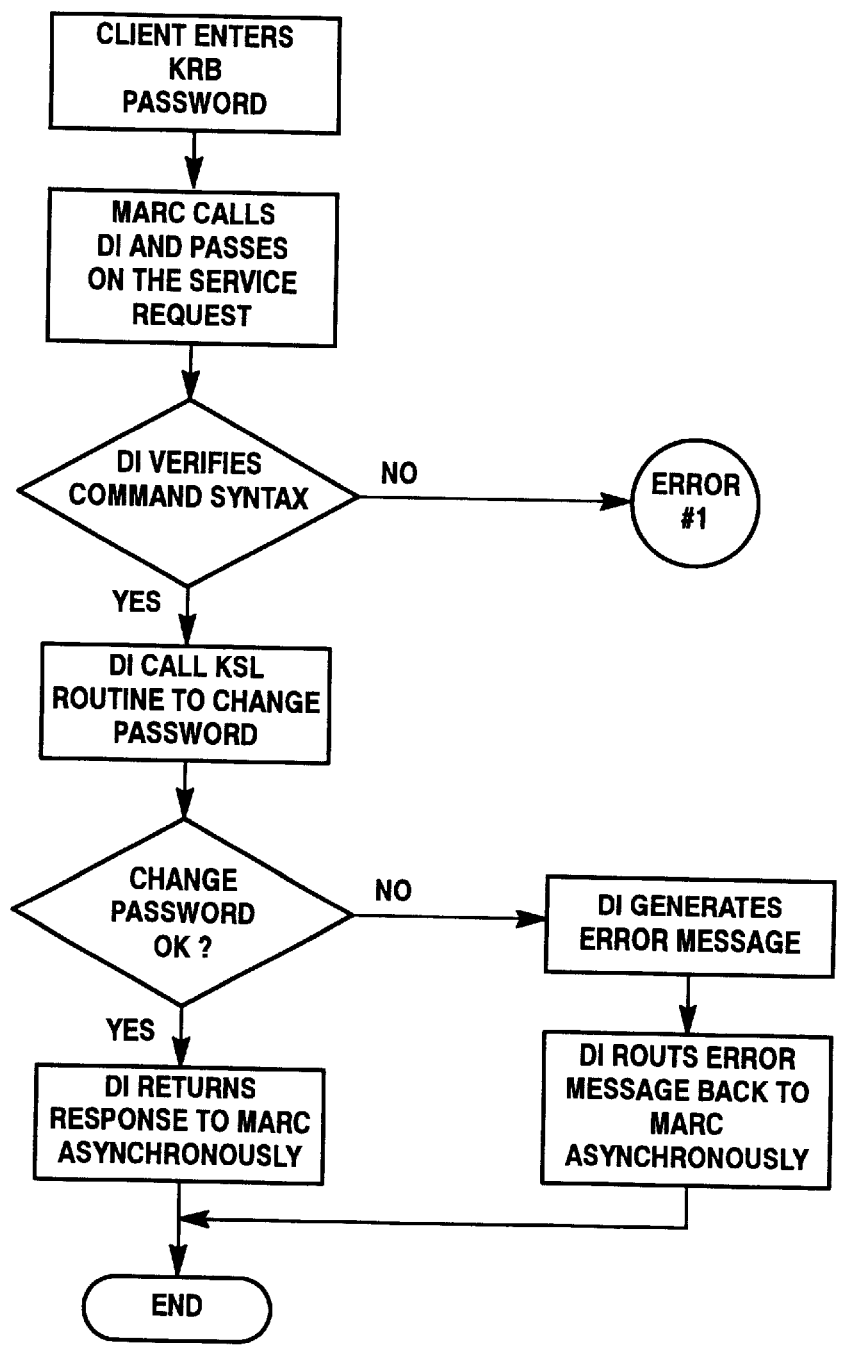
FIG. 3I is a flow chart illustrating the command function KRB PASSWORD, which allows a ClearPath system User to change his Kerberos password in the Kerberos database.

FIG. 3I is a flow chart illustrating the sequential steps required to effectuate the command KRB PASSWORD. This allows a User on the ClearPath system to change their Kerberos password in the Kerberos database 28, FIG. 1.

Here, a ClearPath system User 10 chooses MARC 40 to make a Kerberos service request. The User desires to change their Kerberos password in the Kerberos database. The User then types the Kerberos command-KRB PASSWORD.

The caller (MARC 40) makes the service request through the Kerberos Directive Interface 35 (DI) of the Kerberos Support Library 34. The Directive Interface then checks for the proper command syntax, and then operates to change the password. This processing (of the change in password) is then checked to see if it is okay, and if not, will generate an error message and route the error message back to the caller (MARC 40) asynchronously.

Once the password change by KSL 34 is deemed to be accurate, then a return response is made to the caller (MARC) asynchronously. MARC displays a generic asynchronous response to the User as follows:

"Processing Request"
If there is no error, the response is:
"Kerberos Password Changed"

Figure 3J:
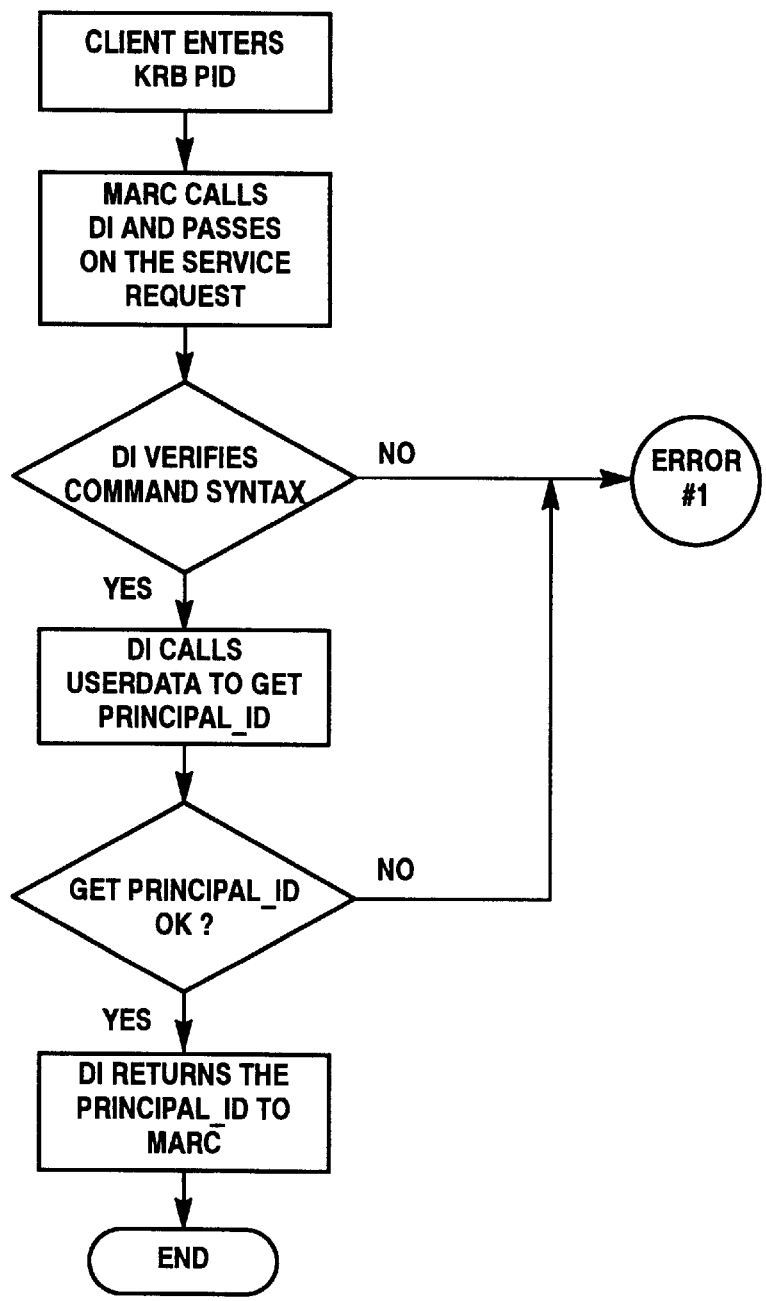
FIG. 3J is a flow chart illustrating the command function designated KRB PID, which allows a ClearPath system User to inquire about his Principal_ID.

FIG. 3J is a flow chart indicating the sequence for accomplishing the command designated KRB PID to inquire as to the User's Principal ID. This command allows a ClearPath system User to inquire as to his or her Principal_ID once he is given a Usercode on the ClearPath system.

A ClearPath system User chooses a method to make a Kerberos service request. The User wants to:

(i) (FIG. 3J) inquire about his or her Principal_ID once given a Usercode. A Usercode is an identifier that identifies the User in a ClearPath system.

(ii) (FIG. 3J1)—or the User wants to add his or her Principal_ID to the Kerberos Database 28. A Principal_ID is an identifier that identifies a User in a Kerberized environment. It involves a unique name for a Principal. An example of a User Principal_ID would be:

Fred@mpa15ab.unisys.com.

The identifier has three components, (i) a Principal_Name; (ii) an Instance_Name; and (iii) a Realm_Name. A Principal_Name is either the name of a service or a User and must be unique within a given Realm. The Instance_Name is a grouping to further identify the Principal_Name and it is an optional ID. The Realm_Name is the name of an administrative zone which maintains its own policies and authentication data.

The User for an Inquiry (in FIG. 3J) types in the Kerberos command-KRB PID. The caller (MARC 40) makes this particular service request through the Kerberos Directive Interface 35. The Directive Interface 35 checks for the proper command syntax. If an error should occur, the sequence will go to generate an error message and route it back to the caller. If the command syntax is proper, then one of two branches are sequenced. If the request is not an Inquiry request, then the sequence of FIG. 3J1 is used in order to accomplish the command PID ADD, which enables the User to "add" his Principal_ID to the Kerberos database, 28.

If the request is an "Inquiry," then as per FIG. 3J, a call is made by DI 35 to the USERDATA file 36 in order to get the Principal_ID, then DI 35 checks out the USERDATA file to see if it is appropriate, and then returns the new Principal_ID to the caller (MARC 40), at which time the sequence ENDS.

In FIG. 3J1 after DI 35 checks the command syntax, the second item (ii) involves adding a Principal_ID to the database for the particular caller. This sequence is shown in FIG. 3J1, where the sequence checks the command syntax for the command PID ADD after MARC calls DI 35. The next step (in FIG. 3J1) is to check the privilege of the User by means of DI 35 calling MCP 60. If the User does not have the appropriate privileges, then the User can only add his Principal_ID, and if it is not his Principal_ID, this constitutes an error which will generate an error message and route it back to the caller (MARC).

Assuming now in FIG. 3J1, that the User is an appropriately privileged User (Yes), the DI 35 calls the KSL 34 routing so that the User can add his Principal_ID to the Kerberos database 28 which is checked for accuracy as "OK", and then a return response is made by DI 35 to the caller (MARC 40) asynchronously. MARC displays a generic response to the User as follows:

"Processing Request"
and then displays, if there is no error:
"Principal_ID added"

Figure 3K:
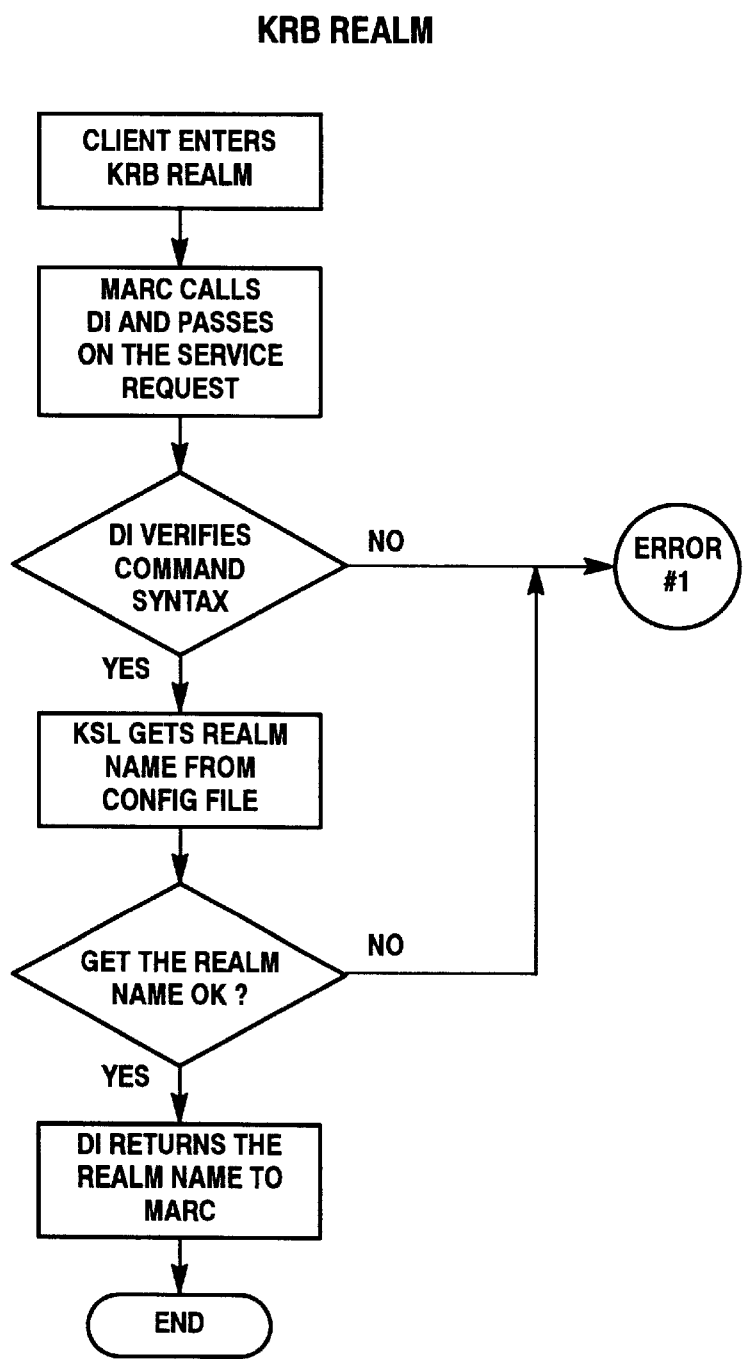
FIG. 3K is a flow chart illustrating the command function KRB REALM, which allows a ClearPath system User to inquire the realm for a local host.

The next command functionality provided by the present system and shown in FIG. 3K, is the use of the command designated KRB REALM. This command allows a ClearPath system User to inquire as to the "Realm" for a local host. As seen in FIG. 2, a Realm might contain multiple domains and each domain have multiple hosts. By being given a host name, the KRB REALM command would return the Realm Name where the host name is located.

In FIG. 3K, the ClearPath system User chooses a method to make a Kerberos service request in that the User wants to inquire regarding a Realm name for a specific local host. The User types in the Kerberos command-KRB REALM.

The caller (MARC 40) makes this service request through the Directive Interface 35 in the Kerberos Support Library 34, whereupon the Directive Interface 35 checks the command for the proper syntax.

The sequence then operates by using the KSL 34 to acquire the Realm name from the Configuration File 42, FIG. 1, FIG. 3.

Once the Realm name is acquired, it is checked by KSL 34 for accuracy and then the Realm name is returned by DI 35 to the caller (MARC) and the sequence is ended-END. However, if the command syntax is not correct, or the Realm name is not correct, then the sequence will go to the error routine (Error #1, FIG. 4) and return an error message to the caller (MARC).

Figure 3L:
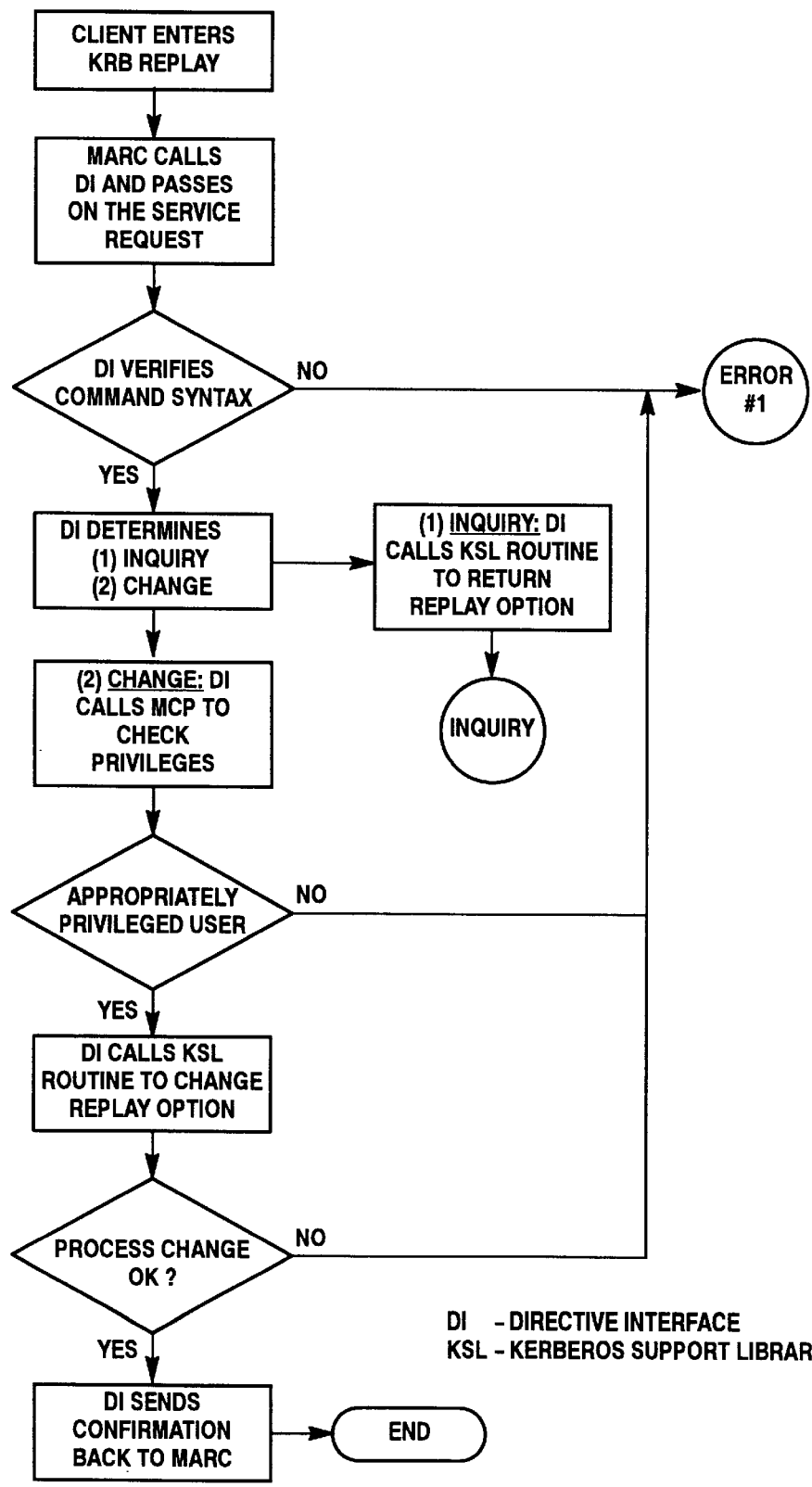
FIG. 3L is a flow chart illustrating the command function KRB REPLAY, which allows a ClearPath system User to inquire and/or change the Replay Detection Option.

FIG. 3L is a flow chart illustrating the sequential functions for developing the command KRB REPLAY. This command allows a ClearPath system User to inquire and/or to change the "Replay Detection" option. The Replay Detection option allows an appropriately privileged User to inquire, or to enable or disable, the Replay Detection option. The Replay Detection function is to indicate if an unauthorized User has tried to extract information from the network with stolen credentials.

Referring to FIG. 3L, a ClearPath system User chooses a method in order to make a Kerberos service request, where this User wants to inquire or to change the Replay Detection option. The User types in the Kerberos command (KRB REPLAY). Then the caller (MARC 40) makes the service request through the Kerberos Directive Interface 35 into the Kerberos. Support Library 34, whereupon the Directive Interface 35 checks this command for the proper command syntax.

If this is a "change" request, (2) (involving the enabling or disabling of the Replay Detection Option) then as a change function, the Directive Interface 35 calls MCP 60 to check the User for the appropriate privileges after which it processes the change, the option KSL 35 checks out the process change to see that it is correct, and then sends the confirmation back to the caller (MARC 40). One of the following messages is displayed to User as:

"Replay detection option is disabled"
"Replay detection option is enabled"
This ENDS the sequence.

Additionally regarding FIG. 3L, after initiation of the KRB REPLAY command, the desire may be for an "Inquiry Request" (1). If this request is correctly processed, then the sequence operates whereby DI 35 calls KSL 34 routines to return the actual "Replay Option. Then DI 35 will route the response back to the caller (MARC 40). If the Replay Detection is "on", then the following is displayed:

"Replay detection option is enabled"
If the Replay Detection is "off", then the following message is displayed:
"Replay detection option is disabled"

Described herein has been a Kerberized Network involving a Client Server and Kerberos Server with implementation for specialized function Kerberos commands which provide great flexibility of choices for the User.

While a preferred embodiment of the system and methods are described, the invention is delineated in the attached claims.

What is claimed is:

1. In a network wherein multiple Client-Users have client terminals which communicate with a client-server having a Kerberos Support Library, holding a Directive Interface and Configuration File which is in communication with said Kerberos Server, and wherein said client-server includes a Kerberos Support Library which is accessed by a Menu Assisted Resource Control Program via a Directive Interface, a method for enabling a requesting client-terminal to utilize a specialized Kerberos command and to receive a generated response, said particular command being designated as a KRB inquiry command and s&id method comprising the steps of:

(a) initiating said KRB command to inquire as to the Kerberos commands available to the Client-User;

(b) calling said Kerberos Support Library in said client server;

(c) checking for the correct command syntax;

(d) checking the privileges available to the Client-User;

(e) providing a list of available commands for an appropriately privileged User;

(f) returning the list back to the Client-User;

(g) initiating, by said Client-User of a KRB clockskew command which further includes the steps of:

(g1) calling, by said MARC program, of said Directive Interface in said Kerberos Support Library to check the command syntax;

(g2) checking whether said clockskew command is an inquiry (i) or a change request (ii) of the clockskew; and which include the steps of:

(g2a) determining if the request is only an inquiry (i) as to the clocksskew value;

(g2b) returning the clockskew value to the Client-User 10;

(g3) checking for the User's privileges if a change request (ii) has been initiated;

(g4) processing the requested change, if the Client-User has been appropriately privileged, said processing calling a routine in said Kerberos Support Library to overwrite the prior value in said Configuration File;

(g5) completing the process of changing the clockskew value;

(g6) sending confirmation of the change back to the Client-User.

2. In a network wherein multiple Client-Users have client terminals which communicate with a client-server having a Kerberos Support Library, and General Security Application Program Interface Library said Client-Server communicating with an associated Kerberos Server wherein each Client-User utilizes a Menu Assisted Resource Control (MARC) program to communicate with said Kerberos Support Library via a Directive Interface and wherein a Client-User has active tickets residing in said Kerberos Support Library, a method for implementing a specialized command KRB DESTROY comprising the steps of:

(d1) initiating by said Client-User, of a KRB DESTROY command;

(d2) calling the Kerberos Support Library to check the command syntax;

(d3) deleting the selected active tickets designated by said Client-User;

(d4) verifying that said selected active tickets have now been deleted;

(d5) calling said General Security Application Program Interface Library (GSS-API) to delete any reference to said selected active tickets;

(d6) deleting any of said reference to selected active tickets residing in said Kerberos Support Library;

(d7) returning back to the Client-User a confirmation that the selected active tickets have been deleted.

3. In a network wherein multiple Client-Users have terminals which communicate with a client-server 13 having a Kerberos Support Library 34 which is in communication with a Kerberos Server 20, and wherein a Menu Assisted Resource Control (MARC) Program 40 communicates with said Kerberos Support Library 34 via a Directive Interface 35, a method for generating an appropriate response to a Clint-User's specialized command to log into the Kerberos Server to obtain a ticket granting ticket (TGT), said method implementing the command of KRT INIT and including the steps of:

(e1) initializing a command KRB INIT by said Client-User 10 to a client server 13;

(e2) using a MARC program 40 through a Directive Interface 35 in order to access said Kerberos Support Library 34;

(e3) checking by said Directive Interface 35 as to the proper command syntax in a situation of command syntax error which then includes the substeps of:

- (e3a) calling a General Security Application Program-Interface Library 38 (GSS-API) to clean up and delete any reference to said ticket;
- (e3b) deleting, by said Kerberos Support Library 34 of any reference to the tickets which it has stored;
- (e3c) generating an error message;
- (e3d) transmitting said error message back to the caller MARC program asynchronously for subsequent display to said Client-User;

(e4) accessing by said Kerberos Support Library 34 of a Ticket-Grant-Ticket from a Key Distribution Center 22;

(e5) storing said granted ticket in said Kerberos Support Library 34;

(e6) returning an asynchronous response to the caller MARC 40 for transmittal to said Client-User.

* * * * *